(12) United States Patent
Malamal Vadakital

(10) Patent No.: US 12,439,056 B2
(45) Date of Patent: Oct. 7, 2025

(54) EDGE FEATURE-ASSISTED PROCESSING OF MULTIVIEW IMAGES

(71) Applicant: Comcast Cable Communications, LLC, Philadelphia, PA (US)

(72) Inventor: Vinod Kumar Malamal Vadakital, Tampere (FI)

(73) Assignee: Comcast Cable Communications, LLC, Philadelphia, PA (US)

( * ) Notice: Subject to any disclaimer, the term of this patent is extended or adjusted under 35 U.S.C. 154(b) by 183 days.

(21) Appl. No.: 18/485,865

(22) Filed: Oct. 12, 2023

(65) Prior Publication Data

US 2024/0129485 A1    Apr. 18, 2024

Related U.S. Application Data

(60) Provisional application No. 63/415,559, filed on Oct. 12, 2022.

(51) Int. Cl.

| | |
|---|---|
| *H04N 7/12* | (2006.01) |
| *H04N 19/124* | (2014.01) |
| *H04N 19/132* | (2014.01) |
| *H04N 19/14* | (2014.01) |
| *H04N 19/167* | (2014.01) |
| *H04N 19/172* | (2014.01) |
| *H04N 19/176* | (2014.01) |
| *H04N 19/18* | (2014.01) |
| *H04N 19/61* | (2014.01) |

(52) U.S. Cl.
CPC .......... *H04N 19/14* (2014.11); *H04N 19/124* (2014.11); *H04N 19/132* (2014.11); *H04N 19/167* (2014.11); *H04N 19/172* (2014.11); *H04N 19/176* (2014.11); *H04N 19/18* (2014.11); *H04N 19/61* (2014.11)

(58) Field of Classification Search
CPC ...................................................... H04N 19/597
See application file for complete search history.

(56) References Cited

U.S. PATENT DOCUMENTS

| | | |
|---|---|---|
| 2014/0168362 A1 | 6/2014 | Hannuksela et al. |
| 2016/0212446 A1 | 7/2016 | Liu et al. |
| 2021/0241496 A1 | 8/2021 | Pesonen et al. |

OTHER PUBLICATIONS

Feb. 20, 2024—European Search Report—EP App. No. 23203280.5.
International Organisation for Standardisation, ISO/IEC JTC 1/SC 29/WG 4, MPEG Video Coding, Jul. 2021, Title: Test Model 11 for MPEG Immersive Video.

*Primary Examiner* — Y Lee
(74) *Attorney, Agent, or Firm* — Banner & Witcoff, Ltd.

(57) ABSTRACT

Multiview images may comprise attribute frames and geometry frames. Samples of a geometry frames may comprise depth information corresponding to collocated samples of the attribute frames. Additional edge feature frames may be generated, for the multiview images, with samples of the edge feature frame indicating whether collocated samples of the geometry frames are at edges and/or discontinuities. Information from the edge feature frame may be used to correct quantization errors that may be associated with samples, of the geometry frames, that are located at edges and discontinuities.

20 Claims, 12 Drawing Sheets

EDGE FEATURE-ASSISTED PROCESSING OF MULTIVIEW IMAGES

CROSS-REFERENCE TO RELATED APPLICATIONS

This application claims the benefit of U.S. Provisional Application No. 63/415,559, filed on Oct. 12, 2022. The above-referenced application is hereby incorporated by reference in its entirety.

BACKGROUND

A computing device may process one or more multiview images for storage, transmission, reception, and/or display. The multiview images may be used for rendering a captured scene from different angles and/or positions.

SUMMARY

The following summary presents a simplified summary of certain features. The summary is not an extensive overview and is not intended to identify key or critical elements.

Multiview images may be used to represent a set of source views captured or generated by multiple real or virtual cameras (e.g., from different viewpoints). Data associated with a multiview image may be processed in the form of atlases that combine information from different source views associated with the multiview image. For example, an attribute atlas may comprise color information and a geometry atlas may comprise depth information associated with samples of the multiview image. Information in an atlas may be processed using transformation (e.g., using a discrete cosine transform (DCT)) and quantization to generate encoded data. Video encoders (e.g., two dimensional (2D) video encoders generally used for encoding atlases) may use a higher quantization step to quantize higher frequency components of a geometry atlas (e.g., corresponding to edges or discontinuities in a multiview image or atlas). Errors due to quantization of higher frequency components using a higher quantization step may not generally be perceptible to the human visual system for 2D images. However, for multiview images, an atlas may also be used (e.g., at a decoder) to render a scene at an intermediate viewpoint or angle that is not captured by the source views of the multiview image. Quantization of higher frequency components using a higher quantization step may result in a rendered/reconstructed scene, at the intermediate viewpoint or angle, having perceptible visual artifacts. An edge feature atlas may be generated, with samples of the edge feature atlas indicating whether collocated or corresponding samples of another atlas (e.g., a geometry atlas) are at an edge or a discontinuity. Information from an edge feature atlas may be used to reduce effects of quantization errors in reconstructed scenes at intermediate viewpoints. For example, a smaller quantization step may be used for a first sample if a collocated or corresponding second sample in the edge feature atlas indicates that that first sample is at an edge or a discontinuity. The use of an edge feature atlas may advantageously reduce occurrence of visual artifacts (e.g., flying points and/or erroneous bloating of objects) in reconstructed scenes.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A shows an example of a residual block of samples from a geometry atlas.
FIG. 4B shows an example of a residual block of samples after having been transformed and quantized by a 2D video encoder.

DETAILED DESCRIPTION

Figure 1:
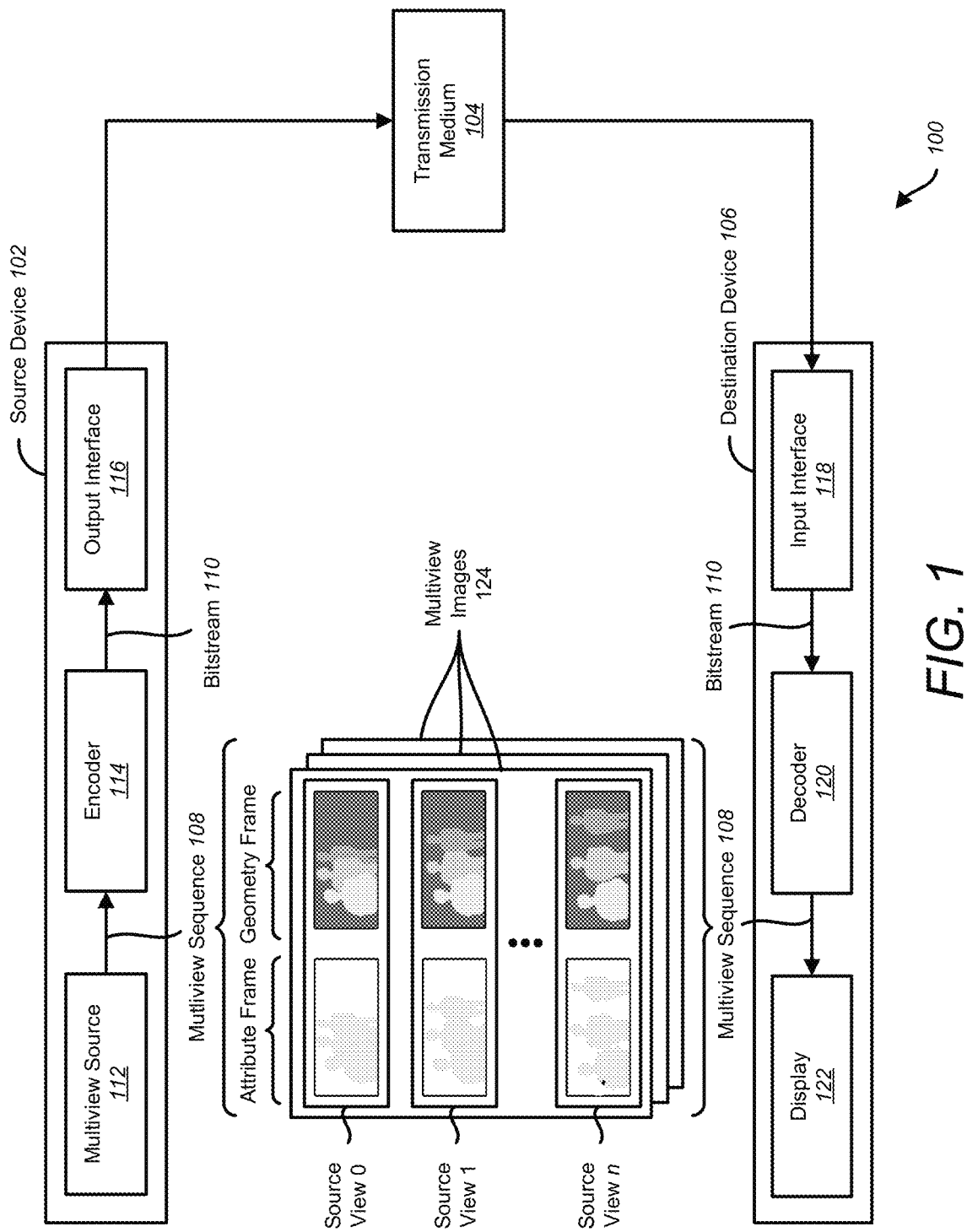
FIG. 1 shows an example multiview coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/reception. More particularly, the technology disclosed herein may relate to video compression as used in encoding and/or decoding devices and/or systems.

Traditional visual data may describe an object and/or scene using a series of points (e.g., pixels). Each pixel may comprise/indicate a position in two dimensions (e.g., x and y) and one or more optional attributes (e.g., color). Volumetric visual data may add another positional dimension to the visual data. Volumetric visual data may describe an object or scene using a series of points that each comprise a position in three dimensions (e.g., x, y, and z) and one or more optional attributes (e.g., color). Compared to traditional visual data, volumetric visual data may provide a more immersive experience of visual data. For example, an object or scene described by volumetric visual data may be viewed from any (or multiple) viewpoints or angles, whereas traditional visual data may generally only be viewed from the viewpoint or angle in which it was captured or rendered. Volumetric visual data may be used in many applications including, for example, augmented reality (AR), virtual reality (VR), mixed reality (MR), etc. Volumetric visual data may by in the form of a volumetric image that describes an object or scene captured at a particular time instance and/or in the form of a sequence of volumetric images (e.g., a volumetric sequence or volumetric video) that describes an object or scene captured at multiple different time instances.

Volumetric visual data may be stored in various formats. For example, volumetric visual data may be stored as a multiview image. A multiview image may comprise a set of source views. Each source view may represent a projection (e.g., equirectangular, perspective, or orthographic) of a three-dimensional (3D) real or virtual scene from a different viewpoint and/or angle. A multiview image may by generated by an arrangement comprising multiple real or virtual cameras, or by a single real or virtual camera. For example, multiple real or virtual cameras may be positioned to capture the scene from different viewpoints. For example, a real or virtual camera may be moved to capture the scene from the different viewpoints. A multiview image may be processed to render the scene at one or more intermediate viewpoints or angles not captured in the multiview image. A sequence of multiview images that describes a scene captured at multiple different time instances may be referred to as a multiview sequence or multiview video.

A source view of a multiview image may be represented by, or include, one or more view parameters. The one or more view parameters may include, for example, camera intrinsic parameters, camera extrinsic parameters, geometry quantization parameters, and the like. A source view of a multiview image may be represented by, or include, one or more attribute frames (e.g., attribute pictures), and/or a geometry frame (e.g., a geometry picture). An attribute frame may provide texture (e.g., color), transparency, surface normal, reflectance information, etc. For example, a value of a sample in an attribute frame may have a value that indicates the texture of the portion of the captured scene projected to the position of the sample. A geometry frame may provide depth and optionally occupancy information. For example, a value of a sample in a geometry frame may have a value equal to zero to indicate that the collocated sample in an attribute frame is unoccupied (e.g., no portion of the captured scene is projected to the collocated sample in the attribute frame). A value of a sample in a geometry frame may have a non-zero value that indicates the depth of the portion of the captured scene projected to the position of the collocated sample in the attribute frame. The depth indicated by the value of a sample in the geometry frame may represent or indicate a distance between the camera (or a projection plane of the camera) and a portion of the captured scene projected to the position of the collocated sample in an attribute frame. Depth information may be estimated or determined using several different techniques. For example, depth information may be determined based on the attribute frames of input views.

A frame may comprise one or more sample arrays of intensity values (or one or more arrays of samples of intensity values). The samples of intensity values may be taken at a series of regularly spaced locations or positions within a frame. An attribute frame (e.g., a color frame, a texture frame) may comprise a luminance sample array and two chrominance sample arrays. The luminance sample array may comprise samples of intensity values representing the brightness (or luma component, Y) of a frame. The two chrominance sample arrays may comprise samples of intensity values that respectively represent the blue and red components of a frame (or chroma components, Cb and Cr) separate from the brightness. Other color frame sample arrays may be possible based on different color schemes (e.g., an RGB color scheme). For color frames, a pixel may refer to (or comprise) all three samples of intensity values for a given location in the three sample arrays used to represent color frames. A monochrome frame may comprise a single, luminance sample array. For monochrome frames, a pixel may refer to (or comprise) a sample of intensity value at a given location in the single, luminance sample array used to represent monochrome frames. The information provided by an attribute frame and a geometry frame may be stored by one or more of the samples of intensity values of a pixel. For example, the depth information of a geometry frame may be stored by the samples of intensity values of the pixels in a monochrome frame or the samples of intensity values of one or more sample arrays of a color frame.

Data size of a multiview image or sequence may be too large for storage and/or transmission in many applications. Encoding may be used to compress the size of a multiview image or sequence to provide more efficient storage and/or transmission. Decoding may be used to decompress a compressed multiview image or sequence for display, rendering (e.g., at an intermediate viewpoint or angle not captured by the source views of the multiview image), and/or other forms of consumption (e.g., by a machine learning based device, neural network-based device, artificial intelligence-based device, and/or other forms of consumption by other types of machine-based processing algorithms and/or devices).

FIG. 1 shows an example multiview coding/decoding system. The multiview coding/decoding system 100 of FIG. 1 may comprise a source device 102, a transmission medium 104, and a destination device 106. The source device 102 may encode a multiview sequence 108 into a bitstream 110 for more efficient storage and/or transmission. The source device 102 may store and/or transmit the bitstream 110 to destination device 106 via a transmission medium 104. The destination device 106 may decode the bitstream 110 to display a viewpoint of a scene captured by the multiview sequence 108, an intermediate viewpoint between two or more viewpoints of the scene captured by the multiview sequence 108, and/or for other forms of consumption. The destination device 106 may receive the bitstream 110 from the source device 102 via a storage medium or transmission medium 104. The source device 102 and/or the destination device 106 may be any of a number/quantity of different devices. The source device 102 and/or the destination device 106 may be a cluster of interconnected computer systems acting as a pool of seamless resources (also referred to as a cloud of computers or cloud computer), a server, a desktop computer, a laptop computer, a tablet computer, a smart phone, a wearable device, a television, a camera, a video gaming console, a set-top box, a video streaming device, an autonomous vehicle, a head-mounted display, etc. A head-mounted display may allow a user to view a virtual reality (VR), an augmented reality (AR), and/or a mixed reality (MR) scene and adjust the view of the scene based on movement of the user's head. A head-mounted display may be tethered to a processing device (e.g., a server, desktop computer, set-top box, and/or video gaming console) or may be fully self-contained.

The source device 102 may comprise a multiview source 112, an encoder 114, and an output interface 116, for example, to encode the multiview sequence 108 into the bitstream 110. The multiview source 112 may provide or generate the multiview sequence 108 from a capture of a natural scene and/or a synthetically generated scene. A synthetically generated scene may be a scene comprising computer generated graphics. Multiview source 112 may comprise an arrangement of multiple real or virtual cameras that are positioned to capture a scene from different viewpoints. Additionally or alternatively, multiview source 112 may comprise a real or virtual camera that is moved to capture a scene from the different viewpoints. Additionally or alternatively, multiview source 112 may comprise a multiview sequence archive comprising a natural scene and/or synthetically generated scene previously captured from the different viewpoints. Additionally or alternatively, multiview source 112 may comprise an ingress feed interface to receive captured natural scenes. Additionally or alternatively, multiview source 112 may comprise synthetically generated scenes from a multiview scene content provider. Additionally or alternatively multiview source 112 may comprise a processor to generate synthetic multiview sequence.

The multiview sequence 108 may comprise a series of multiview images 124. A multiview image may comprise a set of source views. Each source view may represent a projection (e.g., equirectangular, perspective, or orthographic) of a 3D real or virtual scene from a different viewpoint. A source view may be represented by, or include, one or more view parameters (e.g., camera intrinsic parameters, camera extrinsic parameters, geometry quantization parameters, etc.), an attribute frame e.g., an attribute picture), and a geometry frame (e.g., a geometry picture). In the example of FIG. 1, multiview images 124 include "n" source views (e.g., source view 0-source view n), each with corresponding one or more view parameters (not shown), an attribute frame, and a geometry frame. The sequence of multiview images 124 may describe a scene captured at multiple different time instances.

The encoder 114 may encode the multiview sequence 108 into the bitstream 110. The encoder 114, to encode the multiview sequence 108, may use one or more techniques to reduce redundant information in the multiview sequence 108. Redundant information may include information of a captured scene that is included in multiple source views of the multiview sequence 108. For example, one or more pixels of a source view of the multiview sequence 108 may include the same or similar information of a captured scene as one or more pixels of one or more other source views of the multiview sequence 108. Redundancy across different source views may be referred to as inter-view redundancy. The encoder 114 may use one or more techniques to remove or reduce this redundant information. The redundant information may further include information that may be predicted/determined at a decoder. Information that may be predicted/determined at decoder need not be transmitted to the decoder for accurate decoding of the multiview sequence 108. For example, the encoder 114 may use one or more 2D video encoders or encoding methods to the 2D attribute and geometry frames (or portions of the 2D attribute and geometry frames) of the source views of the multiview sequence 108. For example, a Moving Picture Expert Group (MPEG) standard for immersive video (e.g., MPEG immersive video (MIV), as part 12 of the International Organization for Standardization//International Eletroctechnical Commission (ISO/IEC) MPEG-I family of standards, which is incorporated herein by reference) may be used. MIV may allow any one of multiple different proprietary and/or standardized 2D video encoders/decoders to be used to encode/decode 2D attribute and geometry frames (or portions of the 2D attribute and geometry frames) of source views of a multiview sequence. For example, MIV may allow one or more of the following different standardized 2D video encoders/decoders to be used: International Telecommunications Union Telecommunication Standardization Sector (ITU-T) H.263, ITU-T H.264 and MPEG-4 Visual (also known as advanced video coding (AVC)), ITU-T H.265 and MPEG-H part 2 (also known as high efficiency video coding (HEVC), ITU-T H.265 and MPEG-I part 3 (also known as versatile video coding (VVC)), the WebM VP8 and VP9 codecs, AOMedia video 1 and 2 (AV1 and AV2), etc. During standardization of MIV, a test model for immersive video (TMIV) reference software encoder, decoder, and renderer was developed. MIV specifies the encoded bitstream syntax and semantics for transmission and/or storage of a compressed multiview sequence and the decoder operation for reconstructing the compressed multiview sequence from the bitstream. The encoder 114 may operate in a manner similar or substantially similar to the TMIV reference software encoder.

The output interface 116 may be configured to write and/or store the bitstream 110 onto transmission medium 104 for transmission to the destination device 106. The output interface 116 may be configured to transmit, upload, and/or stream the bitstream 110 to the destination device 106 via the transmission medium 104. The output interface 116 may comprise a wired and/or wireless transmitter configured to transmit, upload, and/or stream the bitstream 110 according to one or more non-proprietary, proprietary, and/or standardized communication protocols, (e.g., digital video broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, etc.).

The transmission medium 104 may comprise a wireless, wired, and/or computer readable medium. For example, the transmission medium 104 may comprise one or more wires, cables, air interfaces, optical discs, flash memory, and/or magnetic memory. The transmission medium 104 may comprise one more networks (e.g., the Internet) and/or file servers configured to store and/or transmit encoded video data.

The destination device 106 may decode the bitstream 110 into multiview sequence 108 for display, rendering, or other forms of consumption. The destination device 106 may comprise an input interface 118, a decoder 120, and a display 122. The input interface 118 may be configured to read the bitstream 110 (e.g., stored on/sent via the transmission medium 104 by source device 102). The input interface 118 may be configured to receive, download, and/or stream the bitstream 110, from the source device 102, via the transmission medium 104. The input interface 118 may comprise a wired and/or wireless receiver configured to receive, download, and/or stream the bitstream 110 according to one or more non-proprietary, proprietary, and/or standardized communication protocols (e.g., as mentioned/described herein).

The decoder 120 may decode the multiview sequence 108 from the encoded bitstream 110. The decoder 120, for decoding the Multiview sequence 108, may reconstruct the 2D images that were compressed using one or more 2D video encoders. The decoder 120 may then reconstruct source views (e.g., source view 0-source view n) of the multiview images 124 from the reconstructed 2D images. The decoder 120 may decode a multiview sequence that approximates the multiview images 124. The multiview sequence may approximate the multiview images 124 because of lossy compression of the multiview sequence 108 by the encoder 114 and/or errors introduced into the encoded bitstream 110 if transmission to the destination device 106 occurs. Standardization of MIV comprises development of a TMIV reference software encoder, decoder, and renderer. MIV may specify encoded bitstream syntax and semantics for transmission and/or storage of a compressed multiview sequence, and the decoder operation for reconstructing the compressed multiview sequence from the bitstream. The decoder 120 may operate in a manner that is similar or substantially similar to the TMIV reference software decoder and (optionally) the TMIV reference software renderer.

Display 122 may display a viewpoint of a scene captured in the multiview sequence 108. Additionally or alternatively, display 122 may display an intermediate viewpoint between two or more viewpoints of the scene captured in the multiview sequence 108. The display 122 may comprise a cathode rate tube (CRT) display, a liquid crystal display (LCD), a plasma display, a light emitting diode (LED) display, a 3D display, a holographic display, a head mounted display, and/or any other display device suitable for displaying viewpoints and/or intermediate viewpoints of a sequence captured by the multiview sequence 108.

The multiview coding/decoding system 100 as shown in FIG. 1 is by way of example, and not limitation. The multiview coding/decoding system 100 may have other components and/or arrangements. For example, the multiview source 112 may be external to the source device 102. The display 122 may be external to the destination device 106 or may be omitted altogether (e.g., if the multiview sequence 108 is intended for consumption by a machine and/or storage device). The source device 102 may further comprise a multiview decoder and the destination device 104 may comprise a multiview encoder. In such an example, the source device 102 may be configured to further receive an encoded bit stream from the destination device 106 to support two-way multiview sequence transmission between the devices.

Figure 2:
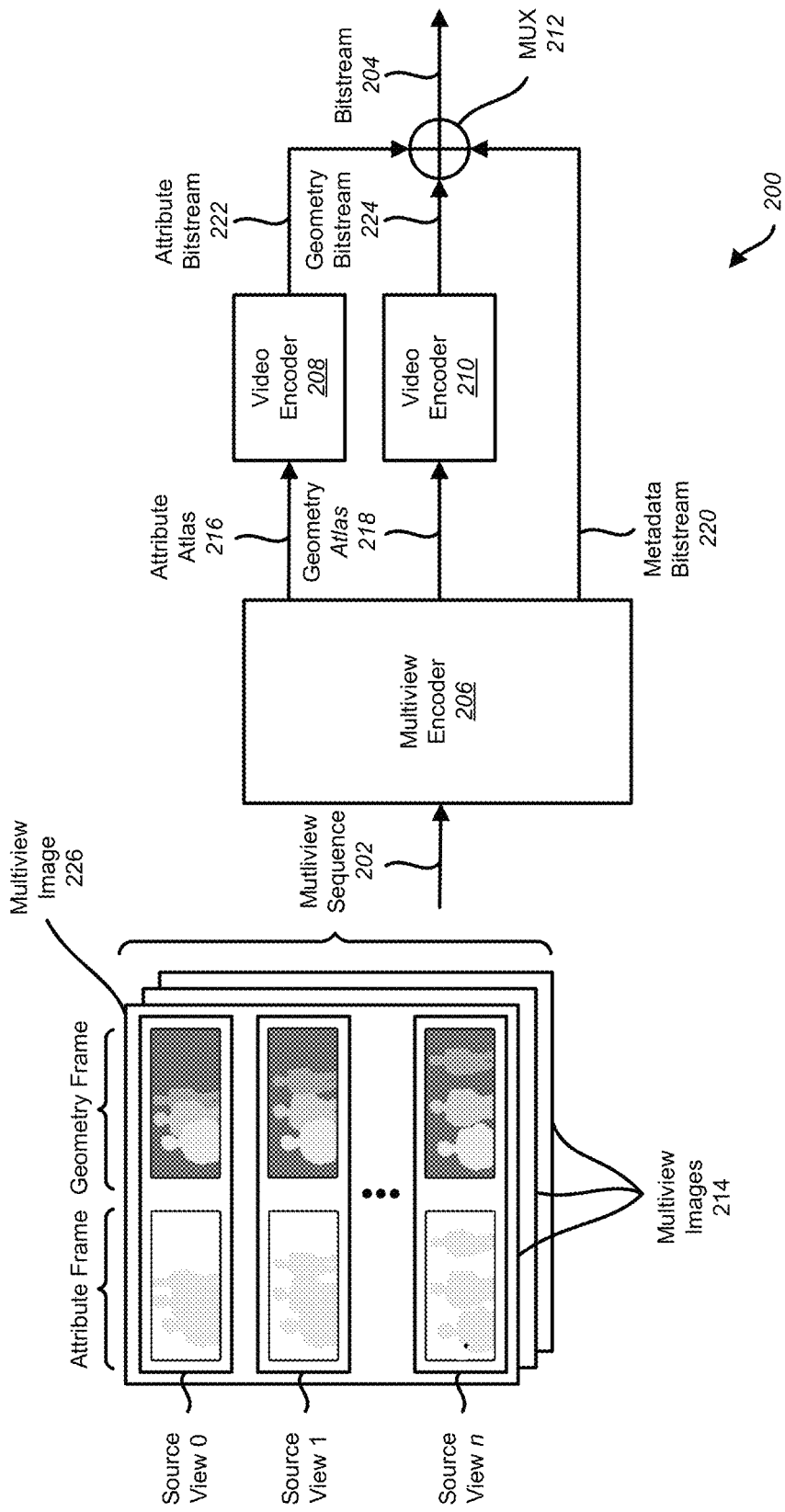
FIG. 2 shows an example encoder.

FIG. 2 shows an example encoder. The encoder 200 may encode a multiview sequence 202 into a bitstream 204 for more efficient storage and/or transmission. The encoder 200 may be implemented in the multiview coding/decoding system 100 in FIG. 1 (e.g., as the encoder 114) and/or in any other device (e.g., a cloud computer, a server, a desktop computer, a laptop computer, a tablet computer, a smart phone, a wearable device, a television, a camera, a video gaming console, a set-top box, a video streaming device, an autonomous vehicle, a head mounted display, etc.). The encoder 200 may comprise a multiview encoder 206, video encoders 208 and 210, and a multiplexer (mux) 212.

A multiview sequence 202 may comprise a sequence of multiview images 214. Each multiview image of the multiview images 214 may include a set of source views (e.g., source view 0-source view n). Source views (e.g., source view 0-source view n) may each represent a projection (e.g., equirectangular, perspective, or orthographic) of a 3D real or virtual scene from a different viewpoint. Each source view (e.g., source view 0-source view n) may be represented by, or may include, one or more view parameters (not shown), an attribute frame (e.g., an attribute picture), and a geometry frame (e.g., a geometry picture). The sequence of multiview images 214 may describe a scene captured at multiple different time instances.

The multiview encoder 206 may generate an attribute atlas and a geometry atlas. The multiview encoder 206 may generate, for each multiview image of the multiview images 214, an attribute atlas and a geometry atlas. For example, the multiview encoder 206 may generate, for a multiview image 226, of the multiview images 214, an attribute atlas 216 and a geometry atlas 218. The multiview encoder 206, to generate attribute atlas 216 and geometry atlas 218 for the multiview image 226, may determine or label one or more of the source views of the multiview image 226 as a basic source view and/or as additional source view(s). The multiview encoder 206 may determine or label each of the source views of the multiview image 226 as either a basic source view or an additional source view, for example, based on a distance and/or overlap to/with a central view position of a scene captured by the multiview image 226. The multiview encoder 206 may include all samples of an attribute frame of a basic source view of the multiview image 226 in an attribute atlas 216 and all samples of a geometry frame of a basic source view of the multiview image 226 in a geometry atlas 218. The multiview encoder 206 may generate and/or form one or more patches extracted from attribute frames of the additional source views of the multiview image 226 and composite (e.g., add and/or append) the patches in the attribute atlas 216. The multiview encoder 206 may similarly generate and/or form one or more patches extracted from geometry frames of the additional source views of the multiview image 226 and composite (e.g., add and/or append) the patches in the geometry atlas 218.

The multiview encoder 206 may process the attribute frames and geometry frames of the additional source views of multiview image 226 to remove and/or prune samples or pixels. The multiview encoder 206 may process the attribute frames and geometry frames of the additional source views of multiview image 226 to remove and/or prune samples or pixels, for example, to form or generate the one or more patches from the attribute frames and geometry frames of the additional source views of multiview image 226. For example, multiview encoder 206 may remove and/or prune samples or pixels, from the attribute frames and geometry frames of the additional source views, that include information in one or more other source views of the multiview image 226. For example, one or more samples or pixels, from the attribute frame and/or the geometry frame of an additional source view of multiview image 226, may include the same, similar, or substantially similar information of (of corresponding to) the captured scene as present in and/or accounted for in one or more samples or pixels from attribute frame and geometry frame of another source view of multiview image 226. Redundancy of information across different source views may be referred to as inter-view redundancy.

The multiview encoder 206 may prune a sample or pixel from an attribute frame and/or a geometry frame of an additional source view of multiview image 226 The multiview encoder 206 may prune a sample or pixel from an attribute frame and/or a geometry frame of an additional source view of multiview image 226, for example, if the sample or pixel may be synthesized from another source view (e.g., another source view higher up in a hierarchy of source views) of the multiview image 226. The multiview encoder 206 may determine that a sample or pixel from an attribute frame and/or a geometry frame of an additional source view of multiview image 226 may be synthesized from another source view (e.g., another source view higher up in a hierarchy of source views) of the multiview image 226. The multiview encoder 206 may determine that a sample or pixel from an attribute frame and/or a geometry frame of an additional source view of multiview image 226 may be synthesized from another source view of the multiview image 226, for example, by de-projecting and then re-projecting samples or pixels from the other source view to the additional source view. The multiview encoder 206 may perform de-projection by placing a point in 3D space for a sample or pixel in the attribute frame (e.g., texture frame) of the other source view at a depth indicated by the geometry frame of the other source view for the sample or pixel. The multiview encoder 206 may perform re-projection by projecting the point in 3D space to the additional source view to form/generate a synthesized pixel or sample. The multiview encoder 206 may prune a sample or pixel in the additional source view. The multiview encoder 206 may prune a sample or pixel in the additional source view, for example, based on depth and attribute information of the synthesized pixel or sample. The multiview encoder 206 may prune a sample or pixel in the additional source view, for example, based on a difference between depth information of the sample or pixel in the additional source view and the synthesized sample or pixel. Additionally or alternatively, the multiview encoder 206 may prune a sample or pixel in the additional source view, for example, based on a difference between attribute information (e.g., texture information) of the sample or pixel in the additional source view and the synthesized sample or pixel. The multiview encoder 206 may prune the sample or pixel in the additional source view, for example, based on or both of the differences being less than a threshold amount. The multiview encoder 206 may repeat the pruning process until all pixels in all additional source views of the multiview image 226 are processed to determine whether a pixel is to be pruned or preserved.

The multiview encoder 206 may store information of whether a sample or pixel from an attribute frame and geometry frame of an additional source view of the multiview image 226 was pruned. The multiview encoder 206 may store this information in a pruning mask. The multiview encoder 206 may accumulate pruning masks over a specific number/quantity of consecutive atlas video frames. The multiview encoder 206 may accumulate pruning masks over a specific number/quantity of consecutive atlas video frames, for example, to make the pruning masks more coherent across adjacent atlas video frames. The multiview encoder 206 may generate patches, for example, after samples or pixels from an attribute frame and geometry frame of an additional source view of the multiview image 226 are pruned. For example, the multiview encoder 206 may generate patches from rectangular bounding boxes around clusters of samples or pixels (e.g., clusters of connected samples or pixels) in the attribute frame and geometry frame of the additional source view that remain if pruning occurs. The multiview encoder 206 may pack (e.g., incorporate, insert) the patches of the attribute frame into the attribute atlas 216. The multiview encoder 206 may pack (e.g., incorporate, insert) the patches of the geometry frame into the geometry atlas 218. The multiview encoder 206 may generate a similar attribute atlas and geometry atlas for each multiview image in multiview images 214 in a similar or substantially similar manner as described herein for the multiview image 226.

Video encoders 208 and 210 may respectively encode the attribute atlas 216 and the geometry atlas 218. For example, in the encoder 200, separate video encoders may be used to respectively encode the attribute atlas 216 and the geometry atlas 218. In other examples, a single video encoder may be used to encode both the attribute atlas 216 and the geometry atlas 218. A single video encoder may be used to encode both the attribute atlas 216 and the geometry atlas 218, for example, if the attribute atlas 216 and the geometry atlas 218 are packed into a single atlas. The video encoders 208 and/or 210 may encode the attribute atlas 216 and geometry atlas 218 according to a video or image codec. The video or image code may include, for example, AVC, HEVC, VVC, VP8, VP9, AV1, AV2, etc. The video encoders 208 and 210 may respectively provide an attribute bitstream 222 and a geometry bitstream 224 as output. Each of the bitstream 222, the geometry bitstream 224, and metadata bitstream 220 may include respective encoded components (e.g., encoded atlases) for each multiview image 214 of the multiview sequence 202.

The video encoders 208 and 210 may use spatial prediction (e.g., intra-frame or intra prediction), temporal prediction (e.g., inter-frame prediction or inter prediction), inter-layer prediction, and/or other prediction techniques to reduce redundant information in a sequence of one or more atlases (e.g., 2 D atlases, such as a sequence of attribute atlases or geometry atlases). The video encoders 208 and 210 may partition the 2D atlases into rectangular regions (e.g., blocks), for example, before using the one or more prediction techniques. The video encoders 208 and 210 may then encode a block using one or more of the prediction techniques.

The video encoders 208 and 210 may search for a block, similar to the block being encoded, in another 2D atlas (e.g., a reference picture) of a sequence of 2D atlases. The video encoders 208 and 210 may search for a block, similar to the block being encoded, in another 2D atlas, for example, for temporal prediction. The block determined from the search (e.g., a prediction block) may be used to predict (e.g., determine) the block being encoded. The video encoders 208 and 210 may form/determine a prediction block, for example, based on data from reconstructed neighboring samples of a block to be encoded within the same 2D atlas of the sequence of 2D atlases. The video encoders 208 and 210 may form a prediction block, for example, for spatial prediction. A reconstructed sample may refer to a sample that was encoded and then decoded. The video encoders 208 and 210 may determine a prediction error (e.g., a residual). The video encoders 208 and 210 may determine a prediction error, for example, based on the difference between a block being encoded and a prediction block. The prediction error may represent non-redundant information that may be transmitted to a decoder for accurate decoding of a sequence of 2D atlases.

The video encoders 208 and 210 may use a transform to the prediction error (e.g., a discrete cosine transform (DCT) or sine transform) to generate transform coefficients. The video encoders 208 and 210 may provide, as output, the transform coefficients and other information used to determine prediction blocks (e.g., prediction types, motion vectors, and prediction modes). The video encoders 208 and 210 may perform one or more of quantization and entropy coding (e.g., arithmetic coding) of the transform coefficients and/or the other information (e.g., used to determine prediction blocks) to further reduce a quantity of bits needed to store and/or transmit a sequence of 2D atlases.

The multiview encoder 206 may generate metadata. The multiview encoder 206 may generate metadata, for example, for each multiview image of the multiview images 214. For example, the multiview encoder 206 may generate, for the multiview image 226 of multiview images 214, metadata that comprises information for reconstructing the source views of multiview image 226 from the attribute atlas 216 and the geometry atlas 218. For example, the metadata for the multiview image 226 may comprise information indicating the packing order, position, rotation, and source view number (or some other indicator of a particular source view) of one or more patches in the attribute atlas 216 and the geometry atlas 218. The metadata for the multiview image 226 may further comprise one or more view parameters of the source views of the multiview image 226. The one or more view parameters may include, for a source view, a projection plane size, a projection type (e.g., perspective, equirectangular, or orthographic), camera intrinsic parameters, camera extrinsic parameters, and/or one or more depth quantization parameters. The multiview encoder 206 may provide the metadata as output via metadata bitstream 220. The multiview encoder 206 may encode the metadata before outputting it via the metadata bitstream 220.

The intrinsic parameters of a camera may provide a relationship between a sample position within an image frame and a ray origin and direction. The extrinsic parameters of a camera may represent the camera pose or position. For example, the camera pose may be represented by a camera position and orientation. The camera position may be indicated by 3D Cartesian coordinates (or any other type of coordinates). The camera orientation may be a unit quaternion. The camera extrinsic parameters may enable the one or more cameras used to capture the different source views of a multiview image to be located in a common coordinate system. A common coordinate system may enable a renderer to render an interpolated view, for example, based on the different source views of the multiview image.

The mux 212 may multiplex the attribute bitstream 222, the geometry bitstream 224, and the metadata bitstream 220 to form (e.g., generate, determine) bitstream 204. The bitstream 204 may be sent to a decoder for decoding.

Encoder 200 of FIG. 2 is presented by way of example and not limitation. The encoder 200 may comprise one or more other components and/or may have a different arrangement/configuration.

Figure 3:
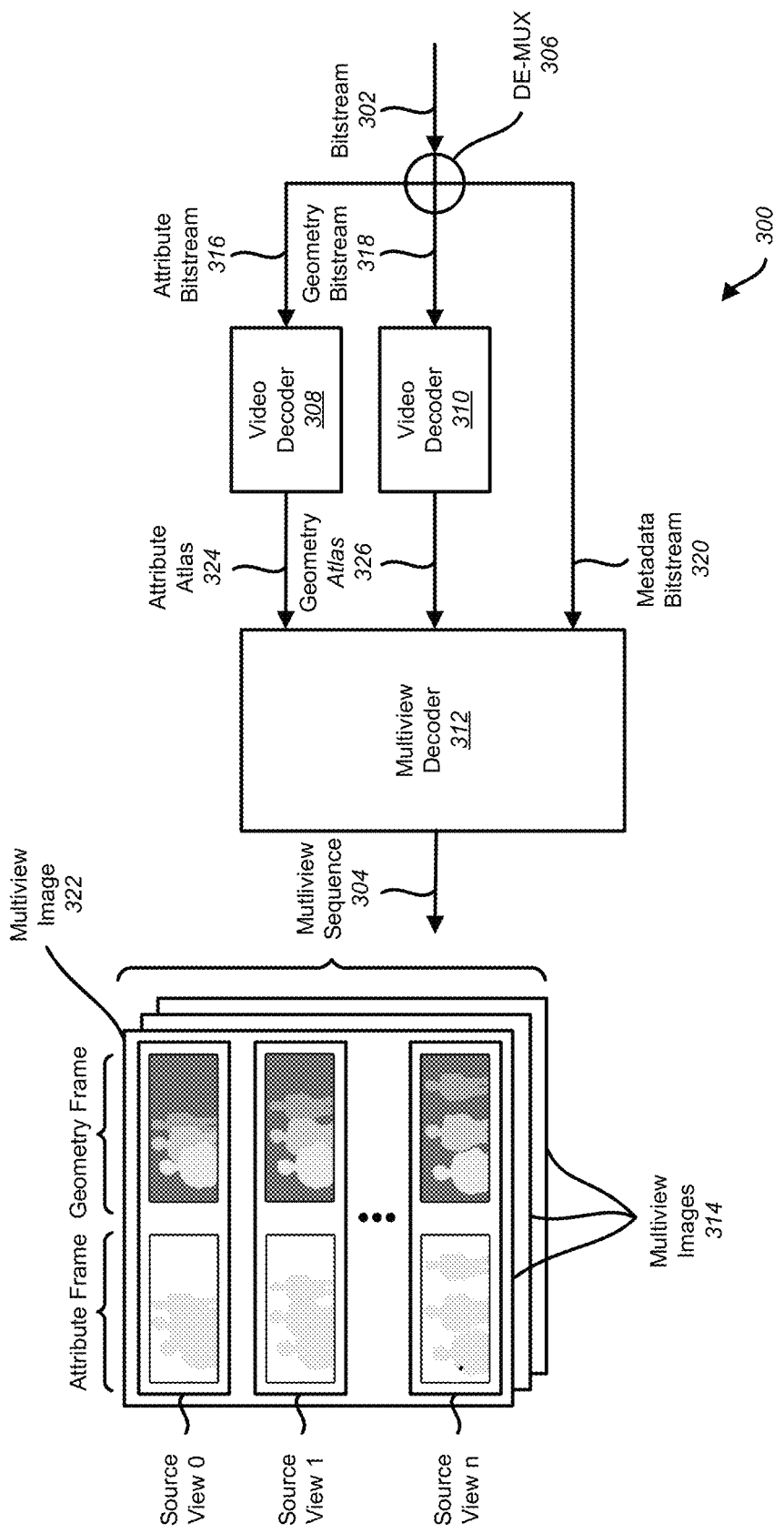
FIG. 3 shows an example decoder.

FIG. 3 shows an example decoder. The decoder 300 of FIG. 3 may decode a bitstream 302 into a decoded multiview sequence 304 for display, rendering, and/or other forms of consumption. The decoder 300 may be implemented in multiview coding/decoding system 100 in FIG. 1 (e.g., as the decoder 120) and/or in any other device (e.g., a cloud computer, a server, a desktop computer, a laptop computer, a tablet computer, a smart phone, a wearable device, a television, a camera, a video gaming console, a set-top box, a video streaming device, an autonomous vehicle, a head mounted display, etc.). The decoder 300 may comprise a de-multiplexer (de-mux) 306, video decoders 308 and 310, and a multiview decoder 312.

A multiview sequence 304 may comprise a sequence of multiview images 314. Each multiview image of multiview images 314 may comprise a set of source views (e.g., source view 0-source view n). Source views (e.g., source view 0-source view n) may each represent a projection (e.g., equirectangular, perspective, or orthographic) of a 3D real or virtual scene from a different viewpoint. Each source view (e.g., source view 0-source view n) may be represented by, or may comprise, one or more view parameters (not shown), an attribute frame (e.g., an attribute picture), and a geometry frame (e.g., a geometry picture). The sequence of multiview images 314 may describe a scene captured at multiple different time instances.

The de-mux 306 may receive bitstream 302. and the de-mux 306 may de-multiplex the bitstream 302 into different bitstreams. The different bitstreams may comprise an attribute bitstream 316, a geometry bitstream 318, and a metadata bitstream 320. The attribute bitstream 316 may comprise attribute atlas(es) for one or more of multiview images 314. For example, the attribute bitstream 316 may comprise, for a multiview image 322 of multiview images 314, an attribute atlas 324. The geometry bitstream 318 may comprise geometry atlas(es) for one or more of multiview images 314. For example, the geometry bitstream 318 may comprise, for the multiview image 322 of multiview images 314, a geometry atlas 326. The attribute atlas 324 and the geometry atlas 326 may be respectively constructed or determined in a similar or substantially similar manner as the attribute atlas 216 and the geometry atlas 224 (e.g., as described herein with respect to FIG. 2).

The metadata bitstream 320 may comprise information for reconstructing the source views, of one or more of the multiview images 314, from attribute atlases and geometry atlases of multiview images 314. For example, the metadata bitstream 320 may comprise information for reconstructing the source views of the multiview image 322 from its respective attribute atlas 324 and the geometry atlas 326. The information for reconstructing the source views of the multiview image 322 may comprise information indicating the packing order, position, rotation, and source view number (or some other indicator of a particular source view) of one or more patches in the attribute atlas 324 and the geometry atlas 326. The metadata bitstream 320 may further comprise one or more view parameters of the source views of one or more of multiview images 314. For example, the metadata bitstream 320 may comprise one or more view parameters of the source views of the multiview image 322. The one or more view parameters may comprise, for a source view, a projection plane size, a projection type (e.g., perspective, equirectangular, or orthographic, camera intrinsic parameters, camera extrinsic parameters, and/or one or more depth quantization parameters.

The atlases included in the attribute bitstream 316 and the geometry bitstream 318 may be in compressed form. For example, the atlases included in the attribute bitstream 316 and the geometry bitstream 318 may have been compressed according to a video or image codec. The video or image codec may include, for example, AVC, HEVC, VVC, VP8, VP9, AV1, etc. The video decoders 308 and 310 may respectively decode the attribute atlases included in the attribute bitstream 316 and the geometry atlases included in the geometry bitstream 318. In other examples, a single video decoder may be used to decode all or multiple ones of the attribute atlases and the geometry atlases from the attribute bitstream 316 and the geometry bitstream 318. The multiview decoder 312 may decode the metadata in the metadata bitstream 220.

The multiview decoder 312 may reconstruct the source views of a multiview image. The multiview decoder 312 may reconstruct the source views of a multiview image, for example, based on the multiview image's attribute atlas (e.g., as received from the video decoder 308), geometry atlas (e.g., as received from the video decoder 310), and metadata. For the multiview image 322, the multiview decoder 312 may aggregate one or more patches among the attribute atlas 324 that belong/correspond to a given source view (e.g., source view n). The multiview decoder 312 may copy these patches (e.g., with a possible rotation and/or flip) from the attribute atlas 324 and place (e.g., insert) them in their respective positions within the attribute frame of the source view. Multiview decoder 312 may use information from the metadata included in the metadata bitstream 320 for multiview image 322 to copy and place (e.g., insert) the patches within the attribute frame of the source view. The multiview decoder 312 may perform similar functions to reconstruct one or more other source views (e.g., except a source view determined or labeled as a basic source view, as determined or labeled at an encoder). The attribute atlas 324 may include the attribute frame of the basic source view as a single patch or a single entity, for example, for a basic source view. Samples or pixels that have been pruned or removed from an attribute frame may not be present in the reconstructed attribute frame.

The multiview decoder 312 may aggregate one or more patches among the geometry atlas 326 that belong/correspond to a given source view (e.g., source view n), for example, for the multiview image 322. The multiview decoder 312 may copy these patches (e.g., with a possible rotation and/or flip) from the geometry atlas 326 and place (e.g., insert) them in their respective positions within the geometry frame of the source view. The multiview decoder 312 may use information from the metadata, included in the metadata bitstream 320 for multiview image 322, to copy and place (e.g., insert) the patches within the geometry frame of the source view. The multiview decoder 312 may perform similar functions to reconstruct one or more other source views (e.g., except a source view determined or labeled as a basic source view, as determined or labeled at an encoder). The geometry atlas 326 may include the geometry frame of the basic source view as a single patch or a single entity, for example, for a basic source view. Samples or pixels that have been pruned or removed from a geometry frame may not be present in the reconstructed geometry frame.

A renderer (not shown in FIG. 3) may process the reconstructed source views of the multiview image 322. A renderer (not shown in FIG. 3) may process the reconstructed source views of the multiview image 322, for example, to render the scene at one or more intermediate viewpoints or angles not captured in the multiview image 322. The renderer may render the scene at an intermediate viewpoint or angle (e.g., as provided by pose coordinates from a head-mounted display) of a target viewport, for example, by de-projecting and then re-projecting samples or pixels from one or more of the reconstructed source views of multiview image 322 to the target viewport. The renderer may perform de-projection, for example, by placing points in 3D space for samples or pixels, in the attribute frames (e.g., texture frames) of the one or more reconstructed source views of multiview image 322, at their respective depths indicated by the geometry frames of the one or more reconstructed source views of the samples or pixels. The renderer may perform re-projection, for example, by projecting the points in 3D space to the target viewport. The renderer may use the camera extrinsic parameters and/or camera intrinsic parameters of the source views of multiview image 322 to de-project the samples or pixels to a 3D space with common coordinates.

The decoder 300 of FIG. 3 is presented by way of example and not limitation. The decoder 300 may comprise one or more other components and/or may have a different arrangement/configuration.

A geometry atlas may be encoded using a 2D video encoder. For example, the geometry atlases of FIG. 2 may be encoded using 2D video encoder 210. A 2D video encoder may use spatial prediction (e.g., intra-frame prediction or intra prediction), temporal prediction (e.g., inter-frame prediction or inter prediction), inter-layer prediction, and/or other prediction techniques to reduce redundant information in a sequence of one or more frames. The 2D video encoder may partition the one or more frames into rectangular regions (e.g., blocks), for example, before using the one or more prediction techniques. The 2D video encoder may then encode a block using one or more of the prediction techniques. For temporal prediction, the 2D video encoder may search for a block, similar to the block being encoded, in another frame (e.g., a reference picture) of the sequence of one or more frames. The block determined from the search (e.g., a prediction block) may be used to predict (e.g., determine) the block being encoded. For spatial prediction, the 2D video encoder may form (e.g., determine, generate) a prediction block based on data from reconstructed neighboring samples, of the block, that are within the same frame. The 2D video encoder may determine a prediction error (e.g., a residual). The 2D video encoder may determine a prediction error (e.g., a residual), for example, based on the difference between a block being encoded and a prediction block. The residual may represent non-redundant information that may be sent/transmitted to a decoder for accurate decoding of the block.

A 2D video encoder may further apply a transform to the residual to generate transform coefficients. The transform may include, for example, a DCT, an approximation of a DCT, or a sine transform. The 2D video encoder may quantize the coefficients to compress the residual. The compressed residual may be sent/transmitted to the decoder.

2D video encoders may generally use a larger quantization step for quantization of coefficients of higher frequency components of a residual than for quantization of coefficients of lower frequency components of the residual. Larger quantization steps may be used because most information of a block of samples of a frame may be contained in lower frequency components. The resulting error from quantizing higher frequency components of the residual may not be highly perceptible in the reconstructed frame to the human visual system (HVS).

Larger quantization step for encoding a block of samples of a geometry atlas (e.g., by a 2D video encoder) may cause issues at a decoder, For example, the resulting error from quantizing higher frequency components of a residual of the block of samples using a larger quantization step may cause issues since a reconstructed geometry atlas may not necessarily be for direct visualization (e.g., like most frames processed by 2D video encoders). A reconstructed geometry atlas (e.g., geometry atlas 326 in FIG. 3) may be used by a renderer to render a scene at an intermediate viewpoint or angle (e.g., as provided by the pose coordinates from a head mounted display) that is not captured in a multiview image. For example, the renderer may de-project and then re-project samples from one or more reconstructed source views of the multiview image to a target viewport. The renderer may perform de-projection, for example, by placing points in 3D space for samples in a reconstructed attribute frame (e.g., a texture frame), of the one or more reconstructed source views, at their respective depths indicated by the reconstructed geometry frames of the one or more source views. The renderer may perform re-projection by projecting the points in 3D space to the target viewport. The rendered scene may be rendered with highly perceptible visual artifacts (e.g., flying points and/or erroneous bloating of objects in a scene), for example, if the depth information in the reconstructed geometry frames (or reconstructed geometry atlas(es) that the reconstructed geometry frames are determined from) is not accurate due to errors from quantization.

Figures 4A, 4B:
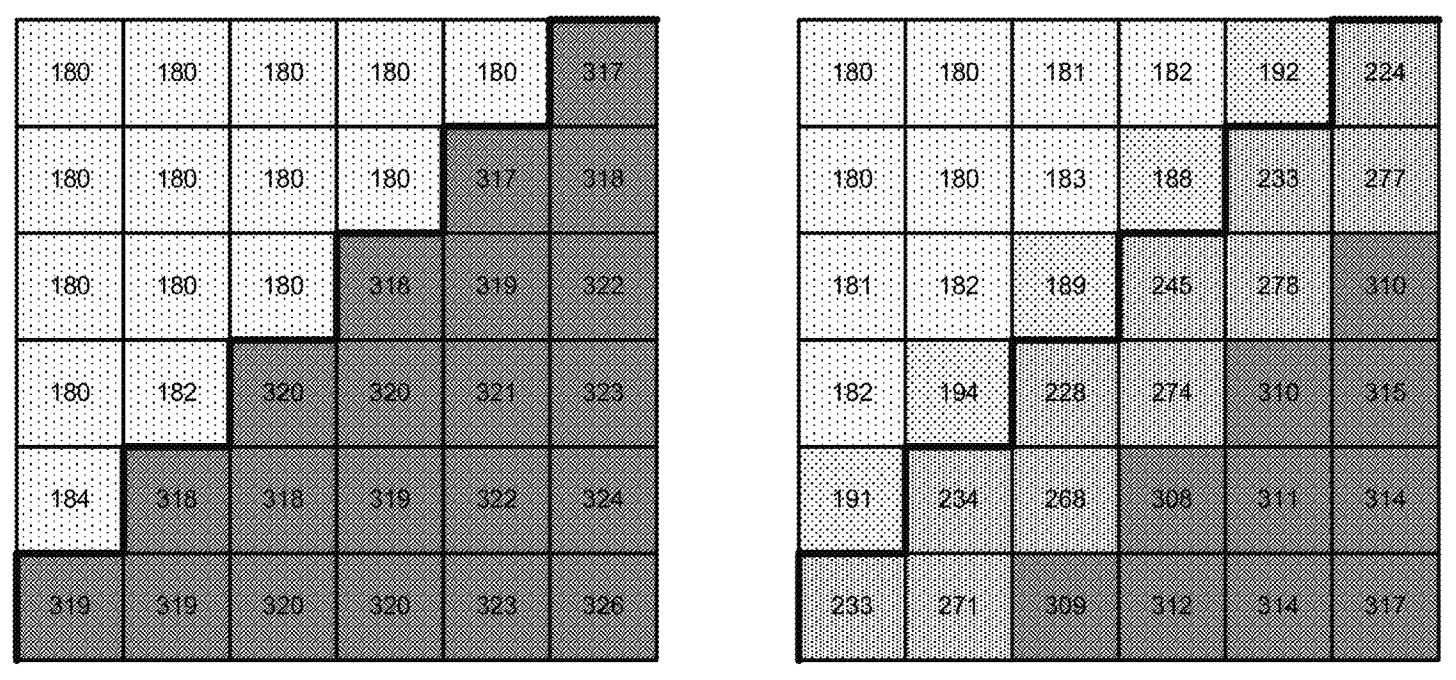

FIG. 4A shows an example of a residual block of samples from a geometry atlas. The block of samples may correspond to samples prior to the residual block being transformed and quantized by a 2D video encoder. The residual block of samples may be a 6×6 residual block of samples. For example, the 6×6 residual block of samples may be from the geometry atlas 218 (as shown in FIG. 2) prior to being transformed and quantized by 2D video encoder 210. The 2D video encoder may have determined the residual block, for example, based on a difference between a current block of samples being encoded and a prediction of the current block (e.g., as determined by intra-prediction or inter-prediction). The sample values of the current block may indicate the depth of a portion of a captured scene projected to a sample in an attribute frame (e.g., a texture frame). The depth indicated by the value of a sample in the geometry atlas may represent or indicate the distance between the camera (or a projection plane of the camera) and the portion of the captured scene projected to the position of the sample in the attribute frame. As shown in FIG. 4A, for example, there may be a relatively sharp discontinuity between the sample values to the left of the staircase diagonal line joining the upper right and lower left samples of the 6×6 residual block and to the right of the diagonal line. For example, the sample values to the left of the diagonal line may be in the range of 180-184, whereas the sample values to the right of the diagonal line may be in the range of 317-326. The discontinuity in the sample values may represent, for example, an edge of an object in a scene captured by the geometry atlas (or the corresponding geometry frame) and its associated attribute frame. The discontinuity in the sample values may further represent high-frequency content in the residual block.

FIG. 4B illustrates an example of the residual block of samples shown in FIG. 4A. FIG. 4B illustrates an example of the residual block of samples shown in FIG. 4A, for example, after having been transformed and quantized by the 2D video encoder. The 2D video encoder may have transformed the 6×6 residual block using a DCT, an approximation to a DCT, or some other transform to generate coefficients. The 2D video encoder may have quantized the coefficients, for example, by applying/using a larger quantization step for coefficients of higher frequency components of the residual block than to coefficients of lower frequency components of the residual. As shown in FIG. 4B, the result of the quantization may be that the relatively sharp discontinuity between the sample values to the left of and to the right of the staircase diagonal joining the upper right and lower left samples of the 6×6 residual block in FIG. 4A (e.g., which represents high-frequency content) has been smoothed. There is no longer a sharp discontinuity between the sample values to the left of the diagonal and to the right of the diagonal. The discontinuity may be more gradual, resulting in a blurring of the discontinuity in the gray-scale image representation of the residual depth information. The blurring may result in rendering errors (e.g., as described herein). For example, the blurring may result in errors in de-projection and re-projection, for example, if rendering a scene at an intermediate viewpoint or angle.

Various examples herein reduce errors in reconstructed geometry frames and/or reconstructed geometry atlases that may be otherwise caused by quantization, for example, in 2D encoding. Samples (e.g., encoded and/or decoded samples) may indicate whether collocated or corresponding samples (e.g., values of collocated or corresponding samples) of a geometry frame and/or geometry atlas are at a boundary of a depth discontinuity. The samples, that indicate whether the values of collocated or corresponding samples of a geometry frame and/or geometry atlas are at a boundary of a depth discontinuity, may be used to reduce errors (e.g., due to quantization performed with 2D encoding) in reconstructed geometry frames and/or reconstructed geometry atlases. Indication of whether a sample is at a boundary of a depth discontinuity may advantageously reduce occurrence of visual artifacts (e.g., flying points and/or erroneous bloating of objects) in reconstructed scenes.

A sample of an atlas may be collocated with a sample of another atlas, for example, based on the samples being located at a same sample (or pixel) position in their respective atlases or at a same sample (or pixel) position in frames from which their respective atlases are generated. For example, a sample in one intensity sample array (e.g., a luminance sample array) of an atlas may be collocated with a sample in another intensity sample array (e.g., a chrominance sample array) of the atlas. The sample in one intensity sample array of an atlas may be collocated with a sample in another intensity sample array of the atlas based on the samples being located at a same sample (or pixel) position in the atlas or at a same sample (or pixel) position in a frame from which the atlas is generated. A sample of an atlas may correspond to a sample of another atlas based on the samples including information for the same, projected portion of a captured scene.

Figure 5:
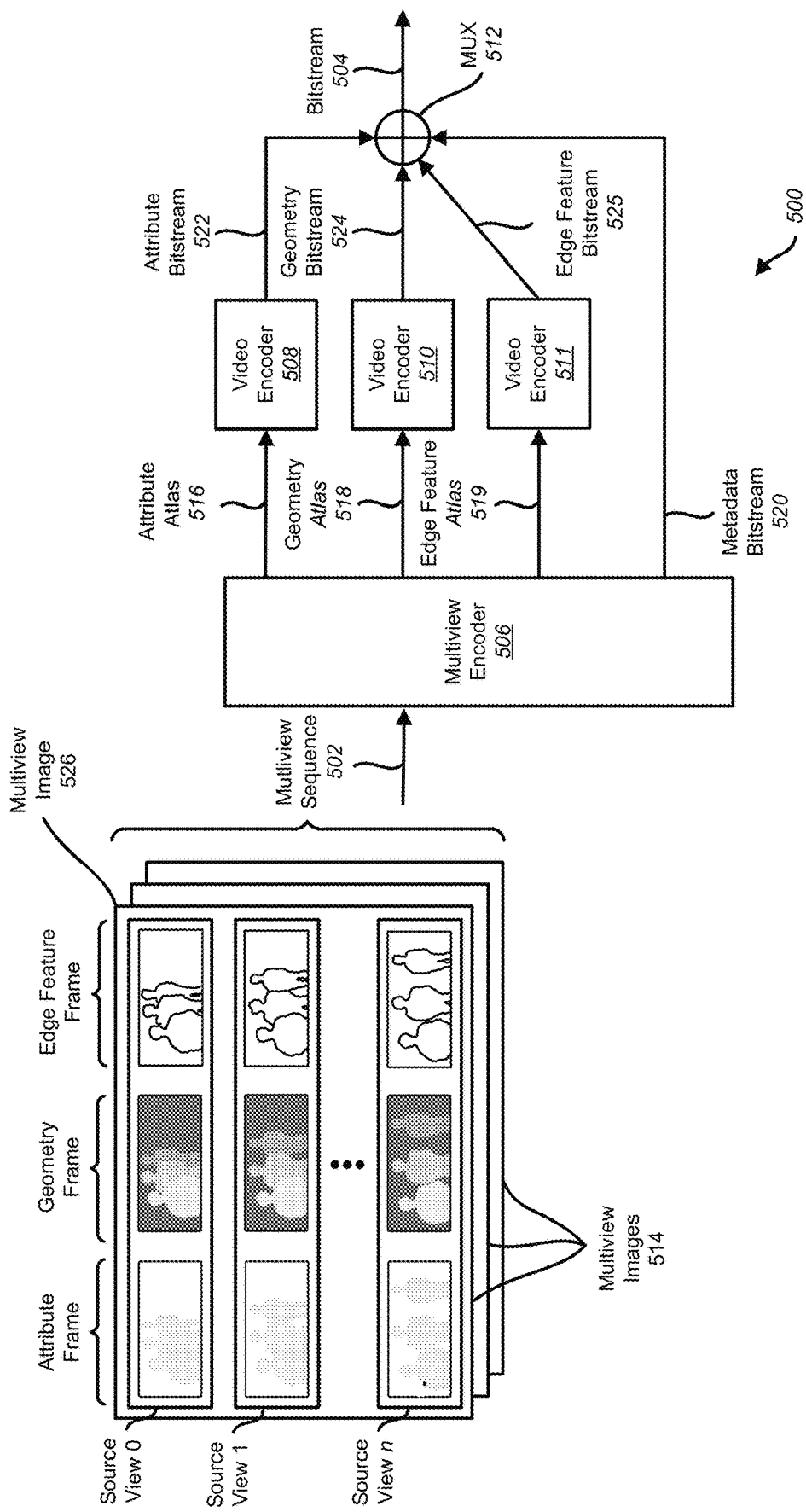
FIG. 5 shows an example encoder.

FIG. 5 shows an example encoder. Encoder 500 as shown in FIG. 5 may encode a multiview sequence 502 into a bitstream 504 for more efficient storage and/or transmission (e.g., to a decoder). The encoder 500 may be implemented in multiview coding/decoding system 100 of FIG. 1 and/or in any other device (e.g., a cloud computer, a server, a desktop computer, a laptop computer, a tablet computer, a smart phone, a wearable device, a television, a camera, a video gaming console, a set-top box, a video streaming device, an autonomous vehicle, and/or a head mounted display). The encoder 500 may comprise a multiview encoder 506, video encoders 508, 510, and 511, and a multiplexer (mux) 512.

The multiview sequence 502 may comprise a sequence of multiview images 514. Each multiview image of multiview images 514 may include a set of source views 0-n. The source views 0-n may each represent a projection (e.g., equirectangular, perspective, or orthographic) of a 3D real or virtual scene from a different viewpoint. Each source view 0-n may be represented by, or include, one or more view parameters (not shown), a texture attribute frame, a geometry frame, and/or an edge feature frame. The sequence of multiview images 514 may describe a scene captured at multiple different time instances.

An attribute frame may provide texture (e.g., color), transparency, surface normal, and/or reflectance information. For example, a value of a sample in an attribute frame may indicate a texture of a portion of the captured scene projected to the position of the sample. A geometry frame may provide depth and, optionally, occupancy information. A sample in a geometry frame may have a value equal to zero to indicate that the collocated (or corresponding) sample in an attribute frame is unoccupied (e.g., no portion of the captured scene is projected to the collocated sample in the attribute frame). A sample in a geometry frame may have a non-zero value to indicate a depth of a portion of the captured scene projected to the position of the collocated (or corresponding) sample in the attribute frame. The depth indicated by the value of a sample in the geometry frame may represent or indicate the distance between the camera (or a projection plane of the camera) and the portion of the captured scene projected to the position of the collocated sample in an attribute frame. The depth information may be estimated and/or determined in several different ways (e.g., based on the attribute frames of the input views).

An edge feature frame may provide information on one or more boundaries of discontinuities in the depth information provided by a geometry frame. The one or more boundaries of discontinuities may be in a same or different source view as the edge feature frame. For example, a value of a sample in an edge feature frame may indicate whether a value of a collocated (or corresponding) sample in a geometry frame is at a boundary of a depth discontinuity. A value of a sample in a geometry frame may be determined to be at a boundary of a depth discontinuity, for example, based on an edge detection algorithm (e.g., a Canny edge detection algorithm, or any other edge detection algorithm). A detected edge in the geometry frame may correspond to a boundary of a depth discontinuity. The edge detection algorithm may determine a gradient magnitude at the sample in the geometry frame. The gradient magnitude may be used to determine if a sample in the geometry frame is at an edge or boundary of a depth discontinuity. A value of a sample in the geometry frame may be determined to be at an edge or boundary of a depth discontinuity, for example, if the gradient magnitude is greater than a threshold. For example, as shown in FIG. 5, a scene captured by multiview images 514 includes three people standing proximate to each other. The samples of the edge feature frame may indicate the values of the samples in the geometry frame at the edges of the three people as being at a boundary of a depth discontinuity. The samples of the edge feature frame may indicate a large change in the values of the geometry frame across the edge regions of the three people in the captured scene. The boundaries of depth discontinuity may indicate high-frequency content in the geometry frame.

A decoder or renderer (not shown in FIG. 5) may use the information in an edge feature frame to correct errors in a reconstructed geometry frame and/or geometry atlas from which the reconstructed geometry frames are determined. For example, a renderer may use the information in an edge feature frame to correct errors due to quantization of transform coefficients performed by a 2D encoder encoding a geometry atlas comprising the geometry frame or patches of the geometry frame. The renderer may filter samples in a reconstructed geometry frame that are along the boundary of a depth discontinuity, as indicated by the edge feature frame, to correct or reduce any blurring of the depth values across the depth discontinuity.

The multiview encoder 506 may generate, for each multiview image of multiview images 514, an attribute atlas, a geometry atlas, and an edge feature atlas. For example, the multiview encoder 506 may generate, for a multiview image 526 of the multiview images 514, an attribute atlas 516, a geometry atlas 518, and an edge feature atlas 519. The multiview encoder 506 may determine or label one or more of the source views of the multiview image 526 as a basic source view or as an additional source view, for example, to generate the attribute atlas 516, the geometry atlas 518, and the edge feature atlas 519 for the multiview image 526. The multiview encoder 506 may determine or label each of the source views of multiview image 526 as either a basic source view or an additional source view, for example, based on a distance from and/or overlap to/with a central view position of a scene captured by the multiview image 526. The multiview encoder 506 may include all samples of an attribute frame of a basic source view of the multiview image 526 in the attribute atlas 516, all samples of a geometry frame of a basic source view of the multiview image 526 in the geometry atlas 518, and all samples of an edge feature frame of a basic source view of the multiview image 526 in the edge feature atlas 519. The multiview encoder 506 may generate or form one or more patches extracted from the attribute frames of the additional source views of the multiview image 526 and composite the patches in the attribute atlas 516. The multiview encoder 506 may generate or form one or more patches extracted from the geometry frames of the additional source views of the multiview image 526 and composite the patches in the geometry atlas 518. The multiview encoder 506 may generate or form one or more patches extracted from the edge feature frames of the additional source views of the multiview image 526 and composite the patches in the edge feature atlas 519.

The multiview encoder 506 may process the attribute frames, the geometry frames, and the edge feature frames, of the additional source views of the multiview image 526, to remove or prune samples or pixels, for example, to form or generate the one or more patches from the attribute frames, the geometry frames, and the edge feature frames of the additional source views of multiview image 526. For example, the multiview encoder 506 may remove or prune samples or pixels, from the attribute frames, the geometry frames, and the edge feature frames of the additional source views, that include information in one or more other source views of the multiview image 526. For example, one or more samples or pixels from an attribute frame, a geometry frame, and an edge feature frame of an additional source view of multiview image 526 may include the same, similar, or substantially information of the captured scene as one or more samples or pixels from an attribute frame, a geometry frame, and an edge feature frame of another source view of the multiview image 526. Redundancy between frames of different source views may be referred to as inter-view redundancy.

The multiview encoder 506 may prune a sample or pixel from an attribute frame, a geometry frame, and/or an edge feature frame of an additional source view of multiview image 526 based on the sample or pixel being capable of being synthesized/determined from another source view (e.g., another source view higher up in a hierarchy of source views) of the multiview image 526. The multiview encoder 506 may determine that a sample or pixel from an attribute frame, a geometry frame, and an edge feature frame of an additional source view of multiview image 526 is capable of being synthesized from another source view (e.g., another source view higher up in a hierarchy of source views) of the multiview image 526, for example, by de-projecting and then re-projecting samples or pixels from the other source view to the additional source view. The multiview encoder 506 may perform de-projection by placing a point in 3D space, for a sample or pixel in the attribute frame (e.g., texture frame) of the other source view, at a depth indicated by the geometry frame of the other source view for the sample or pixel. The multiview encoder 506 may perform re-projection by projecting the point in 3D space to the additional source view to form (e.g., generate, determine) a synthesized pixel or sample. The multiview encoder 506 may prune a sample or pixel in the additional source view, for example, based on depth and attribute information of the synthesized pixel or sample. The multiview encoder 506 may prune a sample or pixel in the additional source view, for example, based on a difference between the depth information of the sample or pixel in the additional source view and the synthesized sample or pixel. Additionally or alternatively the multiview encoder 506 may prune a sample or pixel in the additional source view, for example, based on a difference between the attribute information (e.g., texture information) of the sample or pixel in the additional source view and the synthesized sample or pixel. The multiview encoder 506 may prune the sample or pixel in the additional source view, for example, based on one or both of the differences being less than a threshold amount or corresponding threshold amounts. The multiview encoder 506 may repeat the pruning process until all pixels in all additional source views of the multiview image 526 are determined to be pruned or preserved.

The multiview encoder 506 may store, information regarding (e.g., an indication of) whether a sample or pixel from an attribute frame, a geometry frame, and/or an edge feature frame of an additional source view of the multiview image 526 was pruned. The multiview encoder 506 may store this information in a pruning mask. The multiview encoder 506 may accumulate pruning masks over a specific quantity/number of consecutive atlas frames to make the pruning masks more coherent across adjacent atlas frames. The multiview encoder 506 may generate patches, for example, after samples or pixels from an attribute frame, a geometry frame, and/or an edge feature frame of an additional source view of multiview image 526 are pruned. For example, the multiview encoder 506 may generate patches from rectangular bounding boxes around clusters of samples or pixels (e.g., clusters of connected samples or pixels) in the attribute frame (e.g., a texture attribute frame and/or edge feature attribute frame) geometry frame, and/or edge feature frame of the additional source view that remain after pruning. The multiview encoder 506 may pack (e.g., incorporate, insert) the patches of the attribute frame into the attribute atlas 516. The multiview encoder 506 may pack (e.g., incorporate, insert) the patches of the geometry frame into the geometry atlas 518. The multiview encoder 506 may pack (e.g., incorporate, insert) the patches of the edge feature frame into the edge feature atlas 519. The multiview encoder 506 may generate a similar attribute atlas, geometry feature atlas, and edge feature atlas for each multiview image in the multiview images 514 (e.g., in a manner that is similar or substantially similar as described herein for multiview image 526).

The video encoders 508, 510, and 511 may respectively encode the attribute atlas 516, the geometry atlas 518, and the edge feature atlas 519. Separate video encoders may be used to respectively encode the attribute atlas 516, the geometry atlas 518, and the edge feature atlas 519 (e.g., as shown in the example of encoder 500). A single video encoder may be used to encode two or more of the attribute atlas 516, the geometry atlas 518, and the edge feature atlas 519. For example, a single video encoder may be used to encode both the geometry atlas 518 and the edge feature atlas 519, for example, if both the geometry atlas 518 and the edge feature atlas 519 are packed into a single atlas. The video encoders 508, 510, and 511 may encode the attribute atlas 516, the geometry atlas 518, and the edge feature atlas 519 according to a video or image codec, (e.g., AVC, HEVC, VVC, VP8, VP9, AV1, AV2, and/or any other video/image codec). The video encoders 508, 510, and 511 may respectively provide an attribute bitstream 522, a geometry bitstream 524, and an edge feature bitstream 525 as output. Each of the attribute bitstream 522, the geometry bitstream 524, the edge feature bitstream 525, and metadata bitstream 520 may include/comprise respective encoded components for each multiview image 514 of the multiview sequence 502.

The video encoders 508, 510, and 511 may apply/use spatial prediction (e.g., intra-frame or intra prediction), temporal prediction (e.g., inter-frame prediction or inter prediction), inter-layer prediction, and/or other prediction techniques to reduce redundant information in a sequence of one or more atlases (e.g., 2D atlases, such as a sequence of attribute atlases, geometry atlases, and/or edge feature atlases). The video encoders 508, 510, and 511 may partition the 2D atlases into rectangular regions (e.g., blocks). video encoders 508, 510, and 511 may partition the 2D atlases into rectangular regions (e.g., blocks), for example, before using the one or more prediction techniques. The video encoders 508, 510, and 511 may then encode a block using one or more of the prediction techniques.

For temporal prediction, the video encoders 508, 510, and 511 may search for a block similar to the block being encoded in another 2D atlas (e.g., a reference picture) of a sequence of 2D atlases. The block determined from the search (e.g., a prediction block) may be used to predict (e.g., determine) the block being encoded. For spatial prediction, the video encoders 508, 510, and 511 may form (e.g., generate, determine) a prediction block based on data from reconstructed neighboring samples of the block to be encoded within the same 2D atlas of the sequence of 2D atlases. The video encoders 508, 510, and 511 may determine a prediction error (e.g., a residual), for example, based on the difference between a block being encoded and the prediction block. The residual may represent non-redundant information that may be transmitted to a decoder for accurate decoding of a sequence of 2D atlases.

The video encoders 508, 510, and 511 may further use a transform (e.g., DCT, an approximation of a DCT, a sine transform, or any other type of transform) with respect to a residual to generate transform coefficients. The video encoders 508, 510, and 511 may quantize the coefficients to compress the residual. The video encoders 508, 510, and 511 may quantize the coefficients to compress the residual, for example, before transmitting the residual to the decoder. The video encoders 508, 510, and 511 may use a larger quantization step to quantize coefficients of higher frequency components of the residual than coefficients of lower frequency components of the residual. A larger quantization step may be used for coefficients of higher frequency components because most information of a block of samples of a frame may be typically contained in the lower frequency components. The resulting error from quantizing higher frequency components of the residual may not be highly perceptible in the reconstructed frame to the HVS.

The intended use of the reconstructed version of geometry atlas 518 may not be for direct visualization (e.g., like most frames processed by 2D video encoders). Accordingly, for a block of samples of the geometry atlas 518 that is encoded by the video encoder 510, the resulting error from quantizing higher frequency components of a residual of the block of samples may not be as harmless. More particularly, the reconstructed version of the geometry atlas 518 may be used by a renderer to render a scene at an intermediate viewpoint or angle (e.g., as provided by the pose coordinates from a head mounted display) that is not captured in a multiview image 526. For example, the renderer may de-project and then re-project samples from one or more reconstructed source views of the multiview image 526 to a target viewport. The renderer may perform de-projection, for example, by placing points in 3D space for samples in a reconstructed attribute frame (e.g., a texture frame), of the one or more reconstructed source views, at their respective depths indicated by the reconstructed geometry frames of the one or more source views. The renderer may perform re-projection, for example, by projecting the points in 3D space to the target viewport. The rendered scene may be rendered with highly perceptible visual artifacts (e.g., flying points and/or erroneous bloating of objects in the scene), for example, if the depth information in the reconstructed geometry frames (or reconstructed version of the geometry atlas 518 that reconstructed geometry frames are determined from) is not accurate because of errors from quantization.

A decoder or renderer (not shown in FIG. 5) may use the information in the edge feature atlas 519 (or an edge feature frame determined from the edge feature atlas 519) to correct or reduce errors in the reconstructed version of the geometry atlas 518 (or a geometry frame determined from the reconstructed version of the geometry atlas 518). For example, a renderer may use the information in an edge feature frame to correct or reduce errors due to quantization of transform coefficients (e.g., as performed by the encoder 510 encoding the geometry atlas 518 comprising the geometry frame or patches of the geometry frame). The renderer may filter samples in the geometry frame that are along the boundary of a depth discontinuity as indicated by the edge feature atlas 519 (or an edge feature frame determined from the edge feature atlas 519) to correct or reduce any blurring of depth values across the depth discontinuity.

The multiview encoder 506 may generate metadata, for example, for each multiview image of the multiview images 514. For example, the multiview encoder 506 may generate, for multiview image 526 of the multiview images 514, metadata that includes information for reconstructing the source views of the multiview image 526 from the attribute atlas 516, the geometry atlas 518, and the edge feature atlas 519. For example, the metadata for the multiview image 526 may include information indicating the packing order, position, rotation, and source view number (or some other indicator/index of a particular source view) of one or more patches in the attribute atlas 516, the geometry atlas 518, and the edge feature atlas 519. The metadata for the multiview image 526 may further include one or more view parameters of the source views of the multiview image 526. The one or more view parameters may include, for a source view, a projection plane size, a projection type (e.g., perspective, equirectangular, or orthographic), camera intrinsic parameters, camera extrinsic parameters, and/or one or more depth quantization parameters. The multiview encoder 506 may provide the metadata as output via metadata bitstream 520. The multiview encoder 506 may encode the metadata before outputting it via the metadata bitstream 520.

The intrinsic parameters of a camera may provide a relationship between a sample position within an image frame and a ray origin and direction. The extrinsic parameters of a camera may represent the camera pose or position. For example, the camera pose may be represented by a camera position and orientation. The camera position may be represented as 3D coordinates (e.g., a 3D Cartesian coordinates, or any other 3D coordinates). The camera orientation may be a unit quaternion. The camera extrinsic parameters may allow the one or more cameras used to capture the different source views of a multiview image to be located in a common coordinate system. A common coordinate system may enable a renderer to render an interpolated view based on the different source views of the multiview image.

Mux 512 may multiplex the attribute bitstream 522, the geometry bitstream 524, the edge feature bitstream 525, and the metadata bitstream 520 to form (e.g., generate, determine) bitstream 504. The bitstream 504 may be sent to a decoder for decoding.

The encoder 500 is presented by way of example and not limitation. The encoder 500 may comprise other components and/or may have other arrangements. For example, instead of the edge feature frames of the source views of the multiview image 514 being distinct frames separate from the geometry frames, the edge feature frames may be included in the geometry frames of the source views of the multiview image 514. An edge feature frame of a source view of the multiview image 514 may be included in the geometry frame of the same source view of the multiview image 514. A first sample array of the geometry frame may include/comprise the depth information of the geometry frame and a second sample array of the geometry frame may include/comprise the edge feature information. For example, the first sample array may be a luminance sample array and the second sample array may be a chrominance sample array, or vice-versa. The geometry atlas generated by the multiview encoder 506 for the source view may include the information of the geometry frame and the edge feature frame (included in the geometry frame). The multiview encoder 506 may need not generate a separate edge feature atlas and the video encoder 511 may be omitted from encoder 500, for example, if the geometry frame includes the edge feature information.

The encoder 500 may signal an indication (e.g., in the bitstream 504) that at least one of the sample arrays of the geometry frames carries/comprises the information of the edge feature frames. The encoder 500 may signal an indication (e.g., in the bitstream 504) that at least one of the sample arrays of the geometry frames carries/comprises the information of the edge feature frames, for example, if the information of the edge feature frames is included in the geometry frames of the source views of the multiview image 514. The encoder 500 may signal the indication in bitstream 504 based on a syntax structure. The indication may be included in the syntax structure as a syntax element. The indication may be included in an MIV syntax structure (e.g., vps_miv_extension) as a syntax element (e.g., syntax element vme_edge_features_embedded_in_geometry_flag). Table 1 below shows an example of the vps_miv_extension syntax structure with the syntax element vme_edge_features_embedded_in_geometry_flag.

TABLE 1

| | Descriptor |
|---|---|
| vps_miv_extension( ) { | |
|   vme_geometry_scale_enabled_flag | u(1) |
|   vme_embedded_occupancy_enabled_flag | u(1) |
|   if( !vme_embedded_occupancy_enabled_flag ) | |
|     vme_occupancy_scale_enabled_flag | u(1) |
|   group_mapping( ) | |
|   vme_edge_features_embedded_in_geometry_flag | u(1) |
| } | |

A first value of the syntax element vme_edge_features_embedded_in_geometry_flag (e.g., 1) may indicate that the V3C sub-bitstream components corresponding to the geometry components (e.g., which are determined through either examining if vuh_unit_type is equal to V3C_GVD or through external means if the V3C unit header is unavailable) contain edge-map data encoded in a first chroma channel of the geometry bitstream/sub-bitstream. A second value of the syntax element vme_edge_features_embedded_in_geometry_flag (e.g., 0) may indicate that the geometry bitstream/sub-bitstream does not contain edge-map data in the chroma channel, if present. The value of vme_geometry_scale_enabled_flag may be inferred to be equal to 0, if vme_geometry_scale_enabled_flag is not present.

The encoder 500 may signal an indication, in the bitstream 504, that the edge feature frames are encoded in the bitstream 504 as an attribute frame, for example, if the information of the edge feature frames is included in distinct edge feature frames that are separate from the geometry frames of the source views of multiview image 514. The ai_attribute_types in the MIV standard may be extended to include a new attribute type (e.g., that codes the edge feature information) to signal the edge feature frames as a new attribute type. The syntax element ai_attribute_type_id[j][i] may indicate the attribute type of the Attribute Video Data unit with index i for the atlas with atlas indicator/identifier (ID) j. Table 2 below shows an example of modification to a table of ai_attribute_types in the MIV standard to include a new attribute type (named ATTR_EDGE_FEATURES) that codes the edge feature information. The encoder 500 may signal the new attribute type in bitstream 504.

TABLE 2

| ai_attribute_type_id [ j ][ i ] | Identifier | Attribute type |
|---|---|---|
| 0 | ATTR_TEXTURE | Texture |
| 1 | ATTR_MATERIAL_ID | Material ID |
| 2 | ATTR_TRANSPARENCY | Transparency |
| 3 | ATTR_REFLECTANCE | Reflectance |
| 4 | ATTR_NORMAL | Normals |
| 5 | ATTR_EDGE_FEATURES | Edge-features |
| 6 . . . 14 | ATTR_RESERVED | Reserved |
| 15 | ATTR_UNSPECIFIED | Unspecified |

Figure 6:
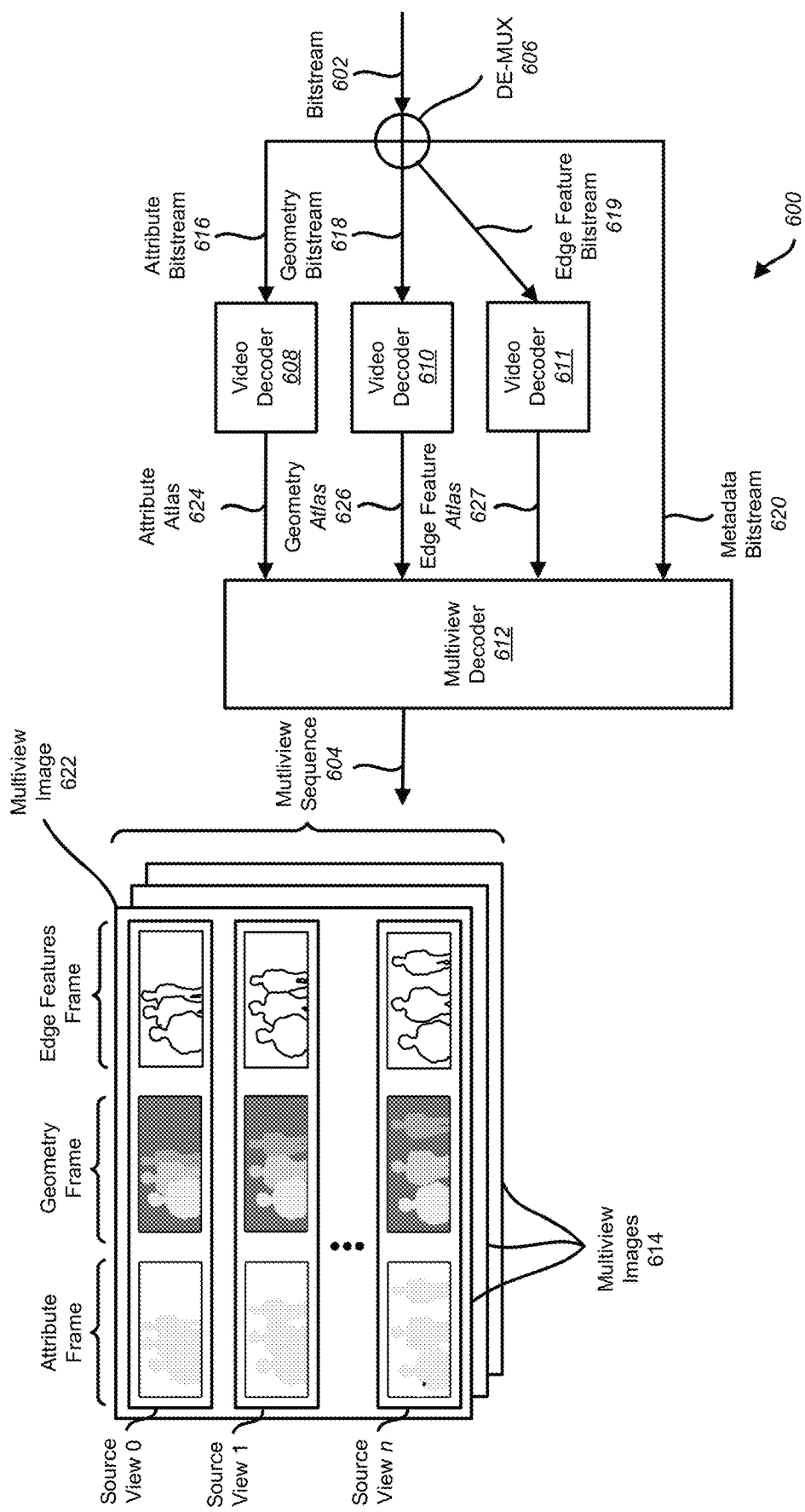
FIG. 6 shows an example decoder.

FIG. 6 shows an example decoder. The decoder 600 may decode a bitstream 602 (e.g., a received bitstream) into a decoded multiview sequence 604 for display, rendering, and/or other forms of consumption. The decoder 600 may be implemented in multiview coding/decoding system 100 (as shown in FIG. 1) or in any other device (e.g., a cloud computer, a server, a desktop computer, a laptop computer, a tablet computer, a smart phone, a wearable device, a television, a camera, a video gaming console, a set-top box, a video streaming device, an autonomous vehicle, a head mounted display, etc.). The decoder 600 may comprise a de-multiplexer (de-mux) 606, video decoders 608, 610, and 611, and a multiview decoder 612.

The multiview sequence 604 may comprise a sequence of multiview images 614. Each multiview image, of the multiview images 614, may include a set of source views (e.g., source view 0-source view n). The source views (e.g., source view 0-source view n) may each represent a projection (e.g., equirectangular, perspective, or orthographic) of a 3D real or virtual scene from a different viewpoint. Each source view (e.g., source view 0-source view n) may be represented by, or include, one or more view parameters (not shown), a texture attribute frame, a geometry frame, and/or an edge feature frame. The sequence of multiview images 614 may describe a scene captured at multiple different time instances.

An attribute frame may provide texture (e.g., color), transparency, surface normal, and/or reflectance information. For example, a sample in an attribute frame may have a value that indicate the texture of the portion of the captured scene projected to the position of the sample. A geometry frame may provide depth and, optionally, occupancy information. A sample in a geometry frame may have a value equal to zero to indicate that the collocated (or corresponding) sample in an attribute frame is unoccupied (e.g., no portion of the captured scene is projected to the collocated sample in the attribute frame). A sample in a geometry frame may have a non-zero value that indicates a depth of the portion of the captured scene projected to the position of the collocated (or corresponding) sample in the attribute frame. The depth indicated by the value of a sample in the geometry frame may represent or indicate the distance between the camera (or a projection plane of the camera) and a portion of the captured scene projected to the position of the collocated sample in an attribute frame. The depth information may be estimated or determined in several different ways (e.g., based on the attribute frames of the input views).

An edge feature frame may provide information on one or more boundaries of discontinuities in the depth information provided by a geometry frame. The geometry frame may be in a same or different source view as the edge feature frame. For example, a value of a sample in an edge feature frame may indicate whether a value of a collocated (or corresponding) sample in a geometry frame is at a boundary of a depth discontinuity. A value of a sample in a geometry frame may be determined to be at a boundary of a depth discontinuity, for example, based on an edge detection algorithm (e.g., a Canny edge detection algorithm, or any other edge detection algorithm). A detected edge in the geometry frame may correspond to a boundary of a depth discontinuity. The edge detection algorithm may determine a gradient magnitude at the sample in the geometry frame. The value of the sample in the geometry frame may be determined to be at an edge or boundary of a depth discontinuity, for example, if the gradient magnitude is greater than a threshold. In the example of FIG. 6, a scene captured by the multiview images 614 may include three people standing proximate to each other. The samples of the edge feature frame may indicate the values of the samples in the geometry frame at the edges of the three people as being at a boundary of a depth discontinuity. The samples of the edge feature frame may indicate a large change in the values of the geometry frame across the edge regions of the three people in the captured scene. The boundaries of depth discontinuity may indicate high-frequency content in the geometry frame.

The decoder 600 or a renderer (not shown in FIG. 6) may use the information in an edge feature frame to correct errors in a geometry frame of the multiview images 614. Additionally or alternatively, the decoder 600 or a renderer (not shown in FIG. 6) may use the information in an edge feature frame to correct errors in a geometry atlas from which the geometry frame is determined. For example, the decoder 600 or a renderer may use the information in an edge feature frame to correct errors due to quantization of transform coefficients (e.g., as performed by a 2D encoder encoding a geometry atlas comprising the geometry frame or patches of the geometry frame of the multiview images 614). For example, the renderer may filter samples, in a geometry frame, that are along the boundary of a depth discontinuity (e.g., as indicated by the edge feature frame) to correct or reduce any blurring of the depth values across the depth discontinuity.

The de-mux 606 may receive the bitstream 602 and de-multiplex bitstream 602 into different bitstreams. The different bitstreams may comprise an attribute bitstream 616, a geometry bitstream 618, an edge feature bitstream 619, and/or a metadata bitstream 620. The attribute bitstream 616 may comprise an attribute atlas for one or more of the multiview images 614. For example, the attribute bitstream 616 may comprise, for a multiview image 622 of multiview images 614, an attribute atlas 624. The geometry bitstream 618 may comprise a geometry atlas for one or more of the multiview images 614. For example, the geometry bitstream 618 may comprise, for the multiview image 622 of multiview images 614, a geometry atlas 626. The edge feature bitstream 619 may comprise an edge feature atlas for one or more of the multiview images 614. For example, the edge feature bitstream 619 may comprise, for the multiview image 622 of multiview images 614, an edge feature atlas 627. The attribute atlas 624, the geometry atlas 626, and the edge feature atlas 627 may be respectively constructed or determined in the same, similar, or substantially similar manner as the attribute atlas 516, the geometry atlas 524, and the edge feature atlas 525 (e.g., as described herein with respect to FIG. 5).

The metadata bitstream 620 may comprise information for reconstructing the source views of one or more of multiview images 614 from attribute, geometry, and edge feature atlases of the multiview images 614. For example, the metadata bitstream 620 may comprise information for reconstructing the source views of the multiview image 622 from its respective attribute atlas 624, geometry atlas 626, and edge feature atlas 627. The information for reconstructing the source views of multiview image 622 may comprise information indicating the packing order, position, rotation, and/or source view number (or some other indicator of a particular source view) of one or more patches in the attribute atlas 624, the geometry atlas 626, and the edge feature atlas 627. The metadata bitstream 620 may further comprise one or more view parameters of the source views of one or more of the multiview images 614. For example, the metadata bitstream 620 may comprise one or more view parameters of the source views of the multiview image 622. The one or more view parameters may include, for a source view, a projection plane size, a projection type (e.g., perspective, equirectangular, or orthographic), camera intrinsic parameters, camera extrinsic parameters, and/or one or more depth quantization parameters.

The atlases included in the attribute bitstream 616, the geometry bitstream 618, and the edge feature bitstream 619 may be in compressed form. For example, the atlases included in the attribute bitstream 616, geometry bitstream 618, and edge feature bitstream 619 may have been compressed according to a video or image codec (e.g., AVC, HEVC, VVC, VP8, VP9, AV1, or any other video/image codec). The video decoders 608, 610, and 611 may respectively decode the attribute atlases included in the attribute bitstream 616, the geometry atlases included in the geometry bitstream 618, and the edge feature atlases included in the edge feature bitstream 619. In other examples, a single video decoder may be used to decode two or more of the attribute feature atlases, the geometry feature atlases, and the edge feature atlases from the attribute bitstream 616, the geometry bitstream 618, and the edge feature bitstream 619. The multiview decoder 612 may decode the metadata in metadata bitstream 620. The multiview decoder 612 may reconstruct the source views of a multiview image, for example, based on the multiview image's attribute atlas (e.g., as received from the video decoder 608), geometry atlas (e.g., as received from the video decoder 610), edge feature atlas (e.g., as received from the video decoder 611), and metadata.

For the multiview image 622, the multiview decoder 612 may aggregate one or more patches among/in the attribute atlas 624 that belong/correspond to a given source view (e.g., source view n). The multiview decoder 612 may copy these patches (e.g., with a possible rotation and/or flip) from the attribute atlas 624 and place (e.g., insert) the patches in their respective positions within the attribute frame of the source view. The multiview decoder 612 may use information from the metadata, included in metadata bitstream 620 for multiview image 622, to copy and place the patches. The multiview decoder 612 may perform this same process to reconstruct one or more source views, except a source view determined or labeled as a basic source view (e.g., as determined or labeled at an encoder). For a basic source view, the attribute atlas 624 may include the attribute frame of the basic source view as a single patch or single entity. Samples or pixels that have been pruned or removed from an attribute frame may not be present in the reconstructed attribute frame.

For the multiview image 622, the multiview decoder 612 may aggregate one or more patches among/in the geometry atlas 626 that belong/correspond to a given source view (e.g., source view n). The multiview decoder 612 may copy these patches (e.g., with a possible rotation and/or flip) from the geometry atlas 626 and place (e.g., insert) the patches in their respective positions within the geometry frame of the source view. The multiview decoder 612 may use information from the metadata (e.g., included in the metadata bitstream 620) for the multiview image 622 to copy and place the patches. The multiview decoder 612 may perform this same process to reconstruct one or more source views, except a source view determined or labeled as a basic source view (e.g., as determined or labeled at an encoder). For a basic source view, the geometry atlas 626 may include the geometry frame of the basic source view as a single patch or a single entity. Samples or pixels that have been pruned or removed from a geometry frame may not be present in the reconstructed geometry frame.

For the multiview image 622, the multiview decoder 612 may aggregate one or more patches among/from the edge feature atlas 627 that belong/correspond to a given source view (e.g., source view n). The multiview decoder 612 may copy these patches (e.g., with a possible rotation and/or flip) from the edge feature atlas 627 and place (e.g., insert) the patches in their respective positions within the edge feature frame of the source view. The multiview decoder 612 may use information from the metadata (e.g., included in metadata bitstream 620) for the multiview image 622 to copy and place the patches. The multiview decoder 612 may perform this same process to reconstruct one or more source views, except a source view determined or labeled as a basic source view (e.g., as determined or labeled at an encoder). For a basic source view, the edge feature atlas 627 may include the edge feature frame of the basic source view as a single patch or a single entity. Samples or pixels that have been pruned or removed from an edge feature frame may not be present in the reconstructed edge feature frame.

A renderer (not shown in FIG. 6) may process the reconstructed source views of multiview image 622. A renderer (not shown in FIG. 6) may process the reconstructed source views of multiview image 622, for example, to render the scene at one or more intermediate viewpoints or angles not captured in the multiview image 622. For example, the renderer may render the scene at an intermediate viewpoint or angle (e.g., as provided by pose coordinates from a head mounted display) of a target viewport. The renderer may render the scene at an intermediate viewpoint or angle by de-projecting and then re-projecting samples or pixels from one or more of the reconstructed source views of the multiview image 622 to the target viewport. The renderer may perform de-projection by placing points in 3D space for samples or pixels in the attribute frames (e.g., texture frames), of the one or more reconstructed source views of the multiview image 622, at their respective depths indicated by the geometry frames of the one or more reconstructed source views of the samples or pixels. The renderer may further utilize information included in the edge feature frames for placing points, in 3D space, for samples or pixels in the attribute frames of the one or more reconstructed source views of the multiview image 622. The renderer may then perform re-projection, for example, by projecting the points in 3D space to the target viewport. The renderer may use the camera extrinsic parameters and/or camera intrinsic parameters of the source views of multiview image 622 to de-project the samples or pixels to a 3D space with common coordinates.

The decoder 600 is presented by way of example and not limitation. In other examples, the decoder 600 may comprise other components and/or may have arrangements. For example, the edge feature frames of the source views of multiview image 614 may be included in the geometry frames of the source views of multiview image 614 instead of the edge feature frames being distinct frames separate from the geometry frames. For example, an edge feature frame of a source view of multiview image 614 may be included in the geometry frame of the same source view of multiview image 614. A first sample array of the geometry frame may include the depth information of the geometry frame and a second sample array of the geometry frame may include the edge feature information. For example, the first sample array may be a luminance sample array and the second sample array may be a chrominance sample array, or vice-versa. The geometry atlas processed by multiview decoder 612 for the source view may comprise the information of the geometry frame and the edge feature frame (now included in the geometry frame). The multiview decoder 612 need not generate a separate edge feature frame and the video decoder 611 may be omitted from decoder 600, for example, if the geometry frame includes the edge feature information.

The decoder 600 may receive an indication, via the bitstream 602, that at least one of the sample arrays of the geometry frames carries/comprises the information of the edge feature frames. The decoder 600 may receive an indication, via the bitstream 602, that at least one of the sample arrays of the geometry frames carries/comprises the information of the edge feature frames, for example, if information of the edge feature frames is included in the geometry frames of the source views of multiview image 614. For example, the decoder 600 may receive, via the bitstream 602, the indication based on a syntax structure. The indication may be included in the syntax structure as a syntax element. For example, the indication may be included in the MIV syntax structure vps_miv_extension as the syntax element vme_edge_features_embedded_in_geometry_flag. Table 1 shows an example of the vps_miv_extension syntax structure with the syntax element vme_edge_features_embedded_in_geometry_flag.

A first value of the syntax element vme_edge_features_embedded_in_geometry_flag (e.g., 1) may indicate that the V3C sub-bitstream components corresponding to the geometry components (e.g., which are determined through either examining if vuh_unit_type is equal to V3C_GVD, or through external means if the V3C unit header is unavailable) contain edge-map data encoded in a first chroma channel of the geometry bitstream/sub-bitstream. A second value of the syntax element vme_edge_features_embedded_in_geometry_flag (e.g., 0) may indicate that the geometry bitstream/sub-bitstream does not contain edge-map data in the chroma channel, if present. The value of vme_geometry_scale_enabled_flag may be inferred to be equal to 0, if vme_geometry_scale_enabled_flag is not present.

The decoder 600 may receive an indication, in the bitstream 504, that the edge feature frames are encoded in the bitstream 604 as an attribute frame. The decoder 600 may receive an indication, in the bitstream 504, that the edge feature frames are encoded in the bitstream 604 as an attribute frame, for example, if the information of the edge feature frames is included in distinct edge feature frames that are separate from the geometry frames of the source views of the multiview image 614. Parameters, such as ai_attribute_types, in the MIV standard may be extended to include a new attribute type (e.g., that codes the edge feature information) to signal the edge feature frames as a new attribute type (e.g., as described herein with respect to FIG. 5).

Figure 7:
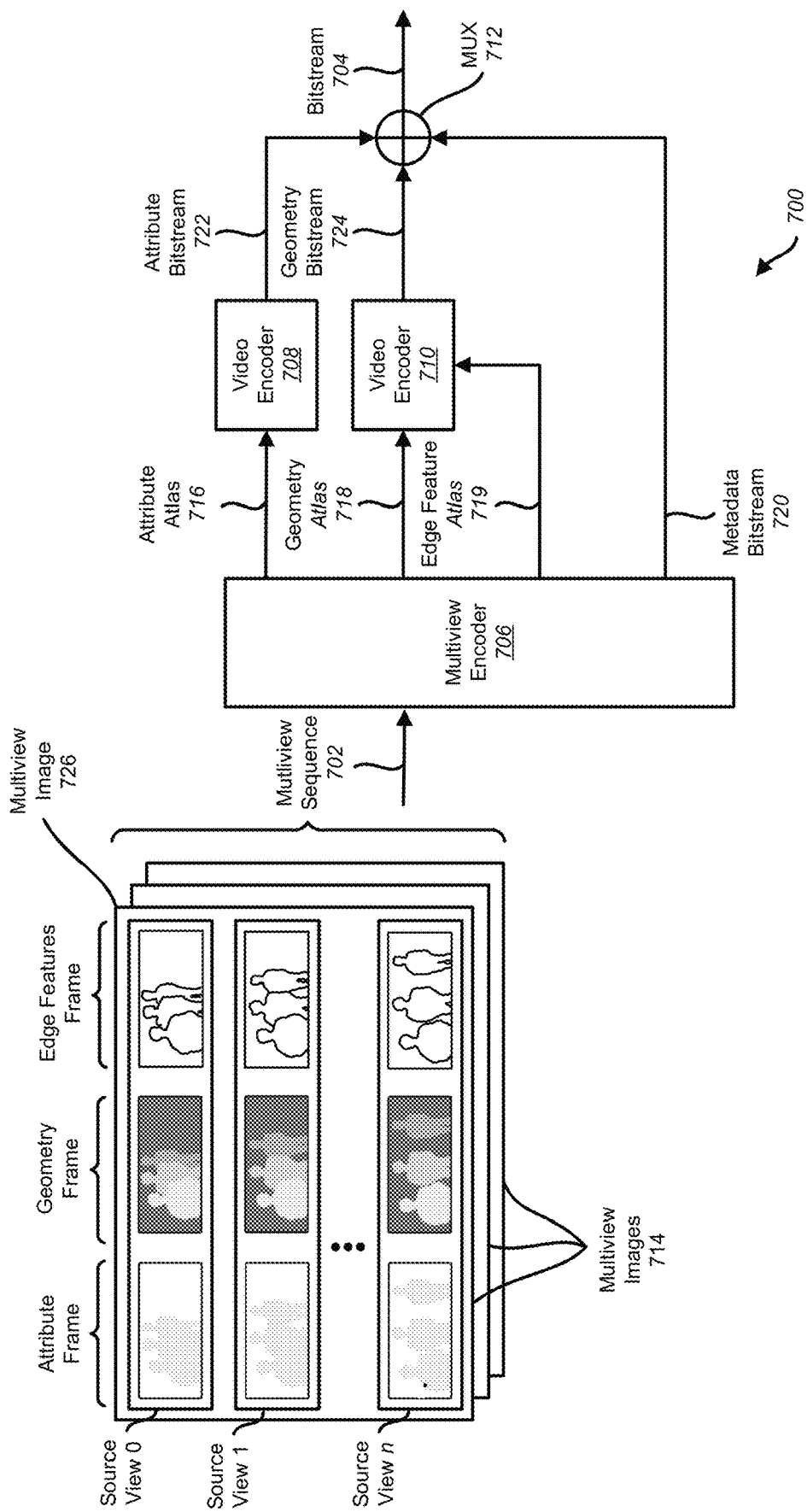
FIG. 7 shows an example encoder.

FIG. 7 shows an example encoder. The encoder 700 of FIG. 7 may encode a multiview sequence 702 into a bitstream 704 for more efficient storage and/or transmission. The encoder 700 may be implemented in the multiview coding/decoding system 100 in FIG. 1 or in any other computing device/system (e.g., a cloud computer, a server, a desktop computer, a laptop computer, a tablet computer, a smart phone, a wearable device, a television, a camera, a video gaming console, a set-top box, a video streaming device, an autonomous vehicle, a head mounted display, etc.). The encoder 700 may comprise a multiview encoder 706, video encoders 708 and 710, and a multiplexer (mux) 712.

A multiview sequence 702 may comprise a sequence of multiview images 714. Each multiview image of the multiview images 714 may include a set of source views (e.g., source view 0-source view n). The source views (e.g., source view 0-source view n) may each represent a projection (e.g., equirectangular, perspective, or orthographic) of a 3D real or virtual scene from a different viewpoint. Each source view (e.g., source view 0-source view n) may be represented by, or include, one or more view parameters (not shown), a texture attribute frame, a geometry frame, and/or an edge feature frame. The sequence of multiview images 714 may describe a scene captured at multiple different time instances.

An attribute frame may provide texture (e.g., color), transparency, surface normal, and/or reflectance information. For example a sample in an attribute frame may have a value that indicates a texture of a portion of the captured scene projected to a position of the sample. A geometry frame may provide depth and optionally occupancy information. A sample in a geometry frame may have a value equal to zero to indicate that the collocated (or corresponding) sample in an attribute frame is unoccupied (e.g., no portion of the captured scene is projected to the collocated sample in the attribute frame). A sample in a geometry frame may have a non-zero value that indicates a depth of a portion of the captured scene, projected to the position of the collocated (or corresponding) sample in the attribute frame. The depth indicated by the value of a sample in the geometry frame may represent or indicate a distance between a camera (or a projection plane of the camera) and the portion of the captured scene projected to the position of the collocated sample in the attribute frame. Depth information may be estimated or determined in several different ways (e.g., based on the attribute frames of the input views).

An edge feature frame may provide information on one or more boundaries of discontinuities in depth information as provided by a geometry frame. The geometry frame may correspond to a same or different source view as the edge feature frame. A value of a sample in an edge feature frame may indicate whether a value of a collocated (or corresponding) sample in a geometry frame is at a boundary of a depth discontinuity. A sample (e.g., a value of the sample) in a geometry frame may be determined to be at a boundary of a depth discontinuity, for example, based on an edge detection algorithm (e.g., a Canny edge detection algorithm, or any other edge detection algorithm). A detected edge in the geometry frame may correspond to a boundary of a depth discontinuity. The edge detection algorithm may determine a gradient magnitude at the sample in the geometry frame. The sample (e.g., the value of the sample) in the geometry frame may be determined to be at an edge or boundary of a depth discontinuity, for example, if the gradient magnitude is greater than a threshold. For example, as shown in FIG. 7, a scene captured by the multiview images 714 may include three people standing proximate to each other. The samples of the edge feature frame may indicate the values of the samples in the geometry frame, at the edges of the three people, as being at a boundary of a depth discontinuity (or boundaries of depth discontinuities). The samples of the edge feature frame may indicate a large change in the values of the geometry frame across the edge regions of the three people in the captured scene. The boundaries of the depth discontinuity may indicate high-frequency content in the geometry frame.

A 2D encoder may use the information in an edge feature frame to prevent or reduce errors in reconstructed geometry frames. Additionally or alternatively, a 2D encoder may use the information in an edge feature frame to prevent or reduce errors in an encoded geometry atlas (e.g., from which the reconstructed geometry frames are determined). A 2D encoder may use the information in an edge feature frame to prevent or reduce errors due to quantization of transform coefficients as performed by the 2D encoder encoding a geometry atlas (e.g., comprising the geometry frames or patches of the geometry frames). The 2D encoder may adjust a quantization step used to quantize coefficients of a residual block of samples of a geometry atlas, for example based on information in an edge feature frame.

The multiview encoder 706 may generate, for each multiview image of the multiview images 714, an attribute atlas, a geometry atlas, and an edge feature atlas. For example, the multiview encoder 706 may generate, for the multiview image 726 of multiview images 714, an attribute atlas 716, a geometry atlas 718, and an edge feature atlas 719. The multiview encoder 706 may determine and/or label one or more of the source views of multiview image 726 as a basic source view and/or as an additional source view to generate the attribute atlas 716, the geometry atlas 718, and the edge feature atlas 719 for the multiview image 726. For example, the multiview encoder 706 may determine or label each of the source views of multiview image 726 as either a basic source view or an additional source view based on a distance and/or overlap to/with a central view position of a scene captured by the multiview image 726. The multiview encoder 706 may include all samples of an attribute frame of a basic source view of the multiview image 726 in the attribute atlas 716, all samples of a geometry frame of a basic source view of the multiview image 726 in the geometry atlas 718, and all samples of an edge feature frame of a basic source view of the multiview image 726 in the edge feature atlas 719. The multiview encoder 706 may generate or form one or more patches extracted from the attribute frames of the additional source views of the multiview image 726. The multiview encoder 706 may composite (e.g., add, stack) the patches in/to the attribute atlas 716. The multiview encoder 706 may generate or form one or more patches extracted from the geometry frames of the additional source views of the multiview image 726. The multiview encoder 706 may composite/add the patches in/to the geometry atlas 718. The multiview encoder 706 may generate or form one or more patches extracted from the edge feature frames of the additional source views of the multiview image 726. The multiview encoder 706 may composite/add the patches in/to the edge feature atlas 719.

The multiview encoder 706 may process attribute frames, geometry frames, and/or edge feature frames of the additional source views of the multiview image 726 to remove or prune samples or pixels. The multiview encoder 706 may process the attribute frames, geometry frames, and/or edge feature frames of the additional source views of the multiview image 726 to remove and/or prune samples or pixels, for example, to form or generate the one or more patches from the attribute frames, the geometry frames, and/or the edge feature frames of the additional source views of multiview image 726. The multiview encoder 706 may remove or prune samples or pixels, from the attribute frames, the geometry frames, and/or the edge feature frames of the additional source views, that comprise/include information that is present in one or more other source views of multiview image 726. One or more samples or pixels from an attribute frame, a geometry frame, and/or an edge feature frame of an additional source view of the multiview image 726 may include the same or similar information of the captured scene as present in one or more samples or pixels from an attribute frame, a geometry frame, and/or an edge feature frames of another source view of the multiview image 726. Redundancy of information across source views may be referred to as inter-view redundancy.

The multiview encoder 706 may prune a sample or pixel from an attribute frame, a geometry frame, and/or edge feature frame, of an additional source view of the multiview image 726. The multiview encoder 706 may prune a sample or pixel from an attribute frame, a geometry frame, and/or edge feature frame, of an additional source view of the multiview image 726, for example, based on the sample or pixel being capable of being synthesized from another source view (e.g., another source view higher up in a hierarchy of source views) of the multiview image 726. The multiview encoder 706 may determine that a sample or pixel from an attribute frame, a geometry frame, and/or an edge feature frame of an additional source view of the multiview image 726 is capable of being synthesized from another source view (e.g., another source view higher up in a hierarchy of source views) of the multiview image 726, for example, by de-projecting and then re-projecting samples or pixels from the other source view to the additional source view. The multiview encoder 706 may perform de-projection, for example, by placing a point in 3D space, for a sample or pixel in an attribute frame (e.g., a texture frame) of the other source view at a depth indicated by a geometry frame of the other source view for the sample or pixel. The multiview encoder 706 may then perform re-projection, for example, by projecting the point in 3D space to the additional source view to form (e.g., generate, determine) a synthesized pixel or sample. The multiview encoder 706 may prune a sample or pixel in the additional source view, for example, based on depth information and/or attribute information of the synthesized pixel or sample. The multiview encoder 706 may prune a sample or pixel, in the additional source view, for example, based on a difference between depth information of the sample or pixel in the additional source view and the synthesized sample or pixel, and/or based on a difference between attribute information (e.g., texture information) of the sample or pixel in the additional source view and the synthesized sample or pixel. The multiview encoder 706 may prune the sample or pixel in the additional source view, for example, based on one or both of the differences being less than a threshold amount (or corresponding threshold amounts). The multiview encoder 706 may repeat the pruning until all pixels in all additional source views of the multiview image 726 are determined to be either pruned or preserved.

The multiview encoder 706 may store information of whether a sample or pixel from an attribute frame, a geometry frame, and/or an edge feature frame of an additional source view of the multiview image 726 was pruned. The multiview encoder 706 may store the information in a pruning mask. The multiview encoder 706 may accumulate pruning masks over a specific quantity/number of consecutive atlas frames to make the pruning masks more coherent across adjacent atlas frames. The multiview encoder 506 may generate patches, for example, after samples or pixels from an attribute frame, a geometry frame, and/or an edge feature frame of an additional source view of multiview image 726 are pruned. For example, the multiview encoder 706 may generate patches from rectangular bounding boxes around clusters of samples or pixels (e.g., clusters of connected samples or pixels) in the attribute frame (e.g., a texture attribute frame and/or edge feature attribute frame), the geometry frame, and/or the edge feature frame of the additional source view that remain after pruning. The multiview encoder 706 may pack (e.g., incorporate, insert) the patches of the attribute frame into the attribute atlas 716. The multiview encoder 706 may pack (e.g., incorporate, insert) the patches of the geometry frame into the geometry atlas 718. The multiview encoder 706 may pack (e.g., incorporate, insert) the patches of the edge feature frame into the edge feature atlas 719. The multiview encoder 706 may generate a similar attribute atlas, geometry feature atlas, and edge feature atlas for each multiview image in the multiview images 714 in the same, similar, or substantially similar manner as described herein for the multiview image 726.

The video encoders 708 and 710 may respectively encode the attribute atlas 716 and the geometry atlas 718. Separate video encoders may be used to respectively encode the attribute atlas 716 and the geometry atlas 718 (e.g., as shown in the encoder 700). In other examples, a single video encoder may be used to encode both the attribute atlas 716 and the geometry atlas 718. A single video encoder may be used to encode both the attribute atlas 716 and the geometry atlas 718, for example, if both the attribute atlas 716 and the geometry atlas 718 are packed into a single atlas. The video encoders 708 and 710 may encode attribute atlas 716 and geometry atlas 718 according to a video or image codec (e.g., AVC, HEVC, VVC, VP8, VP9, AV1, AV2, and/or any other video or image codec). The video encoders 708 and 710 may respectively provide an attribute bitstream 722 and a geometry bitstream 724 as output. Each of the attribute bitstream 722, the geometry bitstream 724, and metadata bitstream 720 may include respective encoded components for each multiview image 714 of the multiview sequence 702.

The video encoders 708 and 710 may apply/use spatial prediction (e.g., intra-frame or intra prediction), temporal prediction (e.g., inter-frame prediction or inter prediction), inter-layer prediction, and/or other prediction techniques to reduce redundant information in a sequence of one or more atlases (e.g., 2D atlases, such as a sequence of attribute atlases and geometry atlases). The video encoders 708 and 710 may partition the 2D atlases into rectangular regions (e.g., referred to as blocks), for example, before applying/using the one or more prediction techniques. The video encoders 708 and 710 may then encode a block using one or more of the prediction techniques.

For temporal prediction, the video encoders 708 and 710 may search for a block, similar to the block being encoded, in another 2D atlas (e.g., a reference picture) of a sequence of 2D atlases. The block determined from the search (e.g., a prediction block) may then be used to predict (e.g., determine) the block being encoded. For spatial prediction, the video encoders 708 and 710 may form (e.g., generate, determine) a prediction block based on data from reconstructed neighboring samples of the block to be encoded within the same 2D atlas of the sequence of 2D atlases. The video encoders 708 and 710 may determine a prediction error (e.g., a residual) based on a difference between a block being encoded and a prediction block. The residual may represent non-redundant information that may be transmitted to a decoder for accurate decoding of a sequence of 2D atlases.

The video encoders 708 and 710 may further use a transform (e.g., a DCT, an approximation of a DCT, a sine transform, or any other transform) with respect to a residual to generate transform coefficients. The video encoders 708 and 710 may quantize the coefficients to compress the residual, for example, before transmission to the decoder. The video encoders 708 and 710 may use a larger quantization step to quantize coefficients of higher frequency components of the residual than to quantize coefficients of lower frequency components of the residual. A larger quantization step may be used for higher frequency components because most information of a block of samples of a frame may be typically contained in the lower frequency components. The resulting error from quantizing higher frequency components of the residual may not be highly perceptible in the reconstructed frame to the HVS.

The intended use of the reconstructed version of the geometry atlas 718 may not be for direct visualization (e.g., as for most frames processed by 2D video encoders). For a block of samples (e.g., current block of samples) of the geometry atlas 718 that is encoded by the video encoder 710, the resulting error from quantizing higher frequency components of a residual of the block of samples may not be as harmless. More particularly, the reconstructed version of the geometry atlas 718 may be used by a renderer to render a scene at an intermediate viewpoint or angle (e.g., as provided by pose coordinates from a head mounted display) that is not captured in a multiview image 726. For example, the renderer may de-project and then re-project samples from one or more reconstructed source views of the multiview image 726 to a target viewport. The renderer may perform de-projection, for example, by placing points in 3D space for samples in a reconstructed attribute frame (e.g., a texture frame) of the one or more reconstructed source views at their respective depths indicated by reconstructed geometry frames of the one or more reconstructed source views. The renderer may then perform re-projection, for example, by projecting the points in 3D space to the target viewport. The rendered scene may be rendered with highly perceptible visual artifacts (e.g., flying points or erroneous bloating of objects in the scene), for example, if the depth information in the reconstructed geometry frames (or reconstructed version of the geometry atlas 718 that the reconstructed geometry frames are determined from) is not accurate due to errors from quantization.

The video encoder 710 may use the information in the edge feature atlas 719 to prevent or reduce errors from quantizing higher frequency components of a residual of a current block of samples of the geometry atlas 718. For example, the video encoder 710 may quantize the transform coefficients of the residual of the current block of samples (e.g., corresponding to the depth information), for example, based on information in the edge feature atlas 719. The video encoder 710 may quantize the transform coefficients of the residual of the current block of samples, for example, based on whether one or more samples in the edge feature atlas 719, that are collocated with (or correspond to) one or more samples of the current block, indicate that values of the one or more samples of the current block are at a boundary of a depth discontinuity. The video encoder 710 may quantize the transform coefficients, of the residual of the current block of samples, with a quantization step determined, for example, based on the one or more samples in the edge feature atlas 719 that are collocated with (or correspond to) one or more samples of the current block. The video encoder 710 may increase or decrease the quantization step size, for example, based on a quantity/number of the one or more samples in the edge feature atlas 719 indicating that values of the collocated (or corresponding) one or more samples of the current block are at a boundary of a depth discontinuity. The video encoder 710 may decrease the quantization step size, for example, based on the quantity/number of the one or more samples in the edge feature atlas 719, indicating that values of the collocated (or corresponding) one or more samples of the current block are at a boundary of a depth discontinuity, being above a threshold. The video encoder 710 may increase the quantization step size, for example, based on the quantity/number of the one or more samples in the edge feature atlas 719, indicating that values of the collocated (or corresponding) one or more samples of the current block are at a boundary of a depth discontinuity, being below a threshold. The video encoder 710 may quantize the transform coefficients, for example, based on the quantization step, by dividing the transform coefficients by the quantization step and rounding the resultant quotient (e.g., to a required/predetermined precision). Video encoder 710 may skip the transformation and quantization process of the residual of the current block, for example, based on whether one or more samples in the edge feature atlas 719, that are collocated with (or correspond to), one or more samples of the current block, indicate that values of the one or more samples of the current block are at a boundary of a depth discontinuity.

A sample of an atlas may be collocated with a sample of another atlas. A sample of an atlas may be collocated with a sample of another atlas, for example, based on the samples being located at a same sample (or pixel) position in their respective atlases or at a same sample (or pixel) position in frames from which their respective atlases are generated. A sample in one intensity sample array (e.g., a luminance sample array) of an atlas may be collocated with a sample in another intensity sample array (e.g., a chrominance sample array) of the atlas, for example, based on the samples being located at a same sample (or pixel) position in the atlas or at a same sample (or pixel) position in a frame from which the atlas is generated. A sample of a current block in the geometry atlas 718 may be collocated with a sample of the edge feature atlas 719, for example, based on the samples being located at a same sample position in their respective atlases and/or at a same sample position in the frames from which their respective atlases are generated. A sample of a current block in the geometry atlas 718 may correspond with a sample of the edge feature atlas 719, for example, based on the samples including information for the same, projected portion of a captured scene.

The multiview encoder 706 may generate metadata for each multiview image of the multiview images 714. For example, the multiview encoder 706 may generate, for the multiview image 726 of the multiview images 714, metadata that includes information for reconstructing the source views of the multiview image 726 from the attribute atlas 716 and the geometry atlas 718. The metadata for multiview image 726 may include/comprise information indicating the packing order, position, rotation, and source view number (or some other indicator of a particular source view) of one or more patches in the attribute atlas 716 and the geometry atlas 718. The metadata may or may not include information for reconstructing the edge feature frames of the source views of the multiview images 726. The information of the edge feature frame, included in the edge feature atlas 719, may be discarded by the encoder 700 and not transmitted via the bitstream 704, for example, after the information of the edge feature frame is used by the video encoder 710 to encode the geometry atlas 718.

The metadata for the multiview image 726 may further include one or more view parameters of the source views of the multiview image 726. The one or more view parameters may include, for a source view, a projection plane size, a projection type (e.g., perspective, equirectangular, or orthographic), camera intrinsic parameters, camera extrinsic parameters, and/or one or more depth quantization parameters. The multiview encoder 706 may provide the metadata as output via the metadata bitstream 720. The multiview encoder 706 may encode the metadata. The multiview encoder 706 may encode the metadata, for example, before outputting it via the metadata bitstream 720.

The intrinsic parameters of a camera may provide a relationship between a sample position within an image frame and a ray origin and direction. The extrinsic parameters of a camera may represent the camera pose or position. For example, the camera pose may be represented by a camera position and orientation. The camera position may comprise 3D coordinates (e.g., 3D Cartesian coordinates, or any other coordinates). The camera orientation may be a unit quaternion. The camera extrinsic parameters may allow the one or more cameras, used to capture the different source views of a multiview image, to be located in a common coordinate system. A common coordinate system may enable a renderer to render an interpolated view based on the different source views of the multiview image.

The mux 712 may multiplex the attribute bitstream 722 and the geometry bitstream to form (e.g., generate, determine) a bitstream 704. The bitstream 704 may be sent to a decoder for decoding.

The encoder 700 is presented by way of example and not limitation. The encoder 700 may comprise other components and/or may have other arrangements. The edge feature frames may be included in the geometry frames of the source views of the multiview image 714, for example, instead of the edge feature frames of the source views of the multiview image 714 being distinct frames separate from the geometry frames. For example, an edge feature frame of a source view of the multiview image 714 may be included in the geometry frame of the same source view of multiview image 714. A first sample array of the geometry frame may include depth information of the geometry frame and a second sample array of the geometry frame may include the edge feature information. The first sample array may be a luminance sample array and the second sample array may be a chrominance sample array, or vice-versa. The geometry atlas generated by the multiview encoder 706 for the source view may include information of the geometry frame and the edge feature frame (which may be included with the geometry frame). The multiview encoder 706 may no longer generate a separate edge feature atlas, for example, if the geometry atlas includes information of the edge feature frame.

Figure 8:
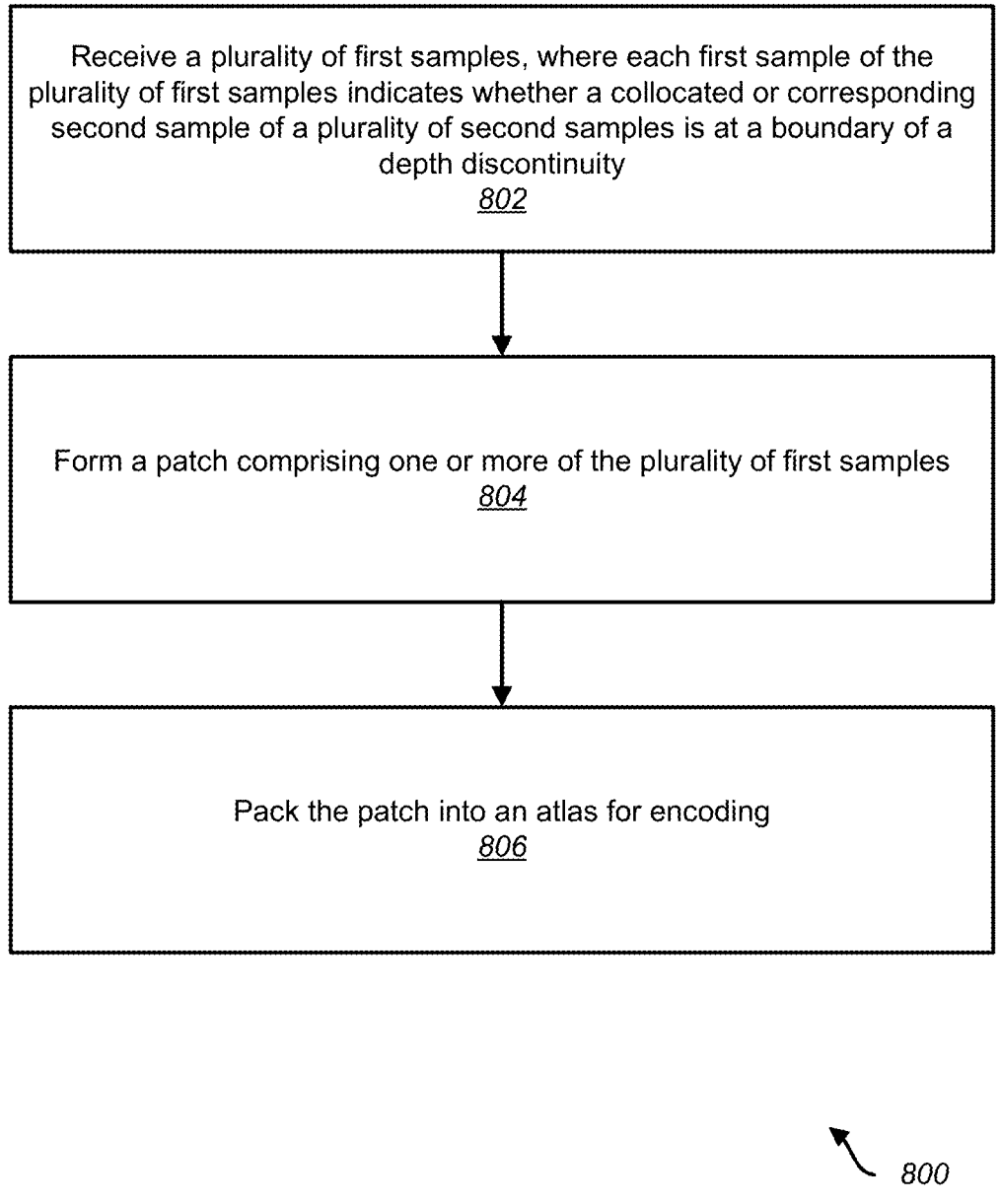
FIG. 8 shows an example method for encoding a multiview sequence.

FIG. 8 shows an example method for encoding a multiview sequence. One or more steps of the example method 800 may be performed by an encoder, such as the encoder 500 shown in FIG. 5.

At step 802, the encoder may receive a plurality of first samples. Each first sample, of the plurality of first samples, may indicate whether a collocated or corresponding second sample (e.g., whether a value of a collocated or corresponding second sample), of a plurality of second samples, is a boundary of a depth discontinuity.

A second sample, of the plurality of second samples, may be collocated with a first sample, of the plurality of first samples. A second sample, of the plurality of second samples, may be collocated with a first sample, of the plurality of first samples, for example, based on the second sample being located at a same position in a same frame as the first sample. A second sample, of the plurality of second samples, may be collocated with a first sample, of the plurality of first samples. A second sample, of the plurality of second samples, may be collocated with a first sample, of the plurality of first samples, for example, based on the second sample being located at a same position (as the first sample) in a frame different from a frame comprising the first sample.

An attribute frame may comprise the plurality of first samples. The encoder may signal, in a bitstream, an indication that a type of the attribute frame is an edge feature type attribute frame.

A geometry frame may comprise both the plurality of first samples and the plurality of second samples. The encoder may indicate/signal, via a bitstream, an indication that an atlas comprises the plurality of first samples. The encoder may indicate/signal, via a bitstream, an indication that a chroma channel of the atlas comprises the plurality of first samples. A first sample array may comprise the plurality of first samples, and a second sample array may comprise the plurality of second samples. The first sample array may be a chrominance sample array, and the second sample array may be a luminance sample array. A frame, comprising the plurality of first samples, may be part of/correspond to a basic source view or an additional source view.

The plurality of second samples may each indicate a depth of a portion of a scene projected to a position of a collocated sample in an attribute frame. A second sample of the plurality of second samples may be determined to be at a boundary of a depth discontinuity, for example, based on an edge detection algorithm. The edge detection algorithm may be a Canny edge detection algorithm, or any other edge detection algorithm.

The collocated or corresponding second sample, of the plurality of second samples, may be determined to be at the boundary of the depth discontinuity. The collocated or corresponding second sample, of the plurality of second samples, may be determined to be at the boundary of the depth discontinuity, for example, based on a gradient magnitude at the second sample. The collocated or corresponding second sample of the plurality of second samples may be determined to be at the boundary of the depth discontinuity, for example, based on a gradient magnitude at the second sample being greater than a threshold.

At step 804, the encoder may form (e.g., determine, create, generate) a patch comprising one or more of the plurality of first samples. The patch may comprise an entire frame comprising the plurality of first samples. At step 806, the encoder may pack (e.g., incorporate, insert) the patch into an atlas for encoding. For example, the encoder may generate the atlas based on the patch. The encoding may be performed by a 2D video encoder.

Figure 9:
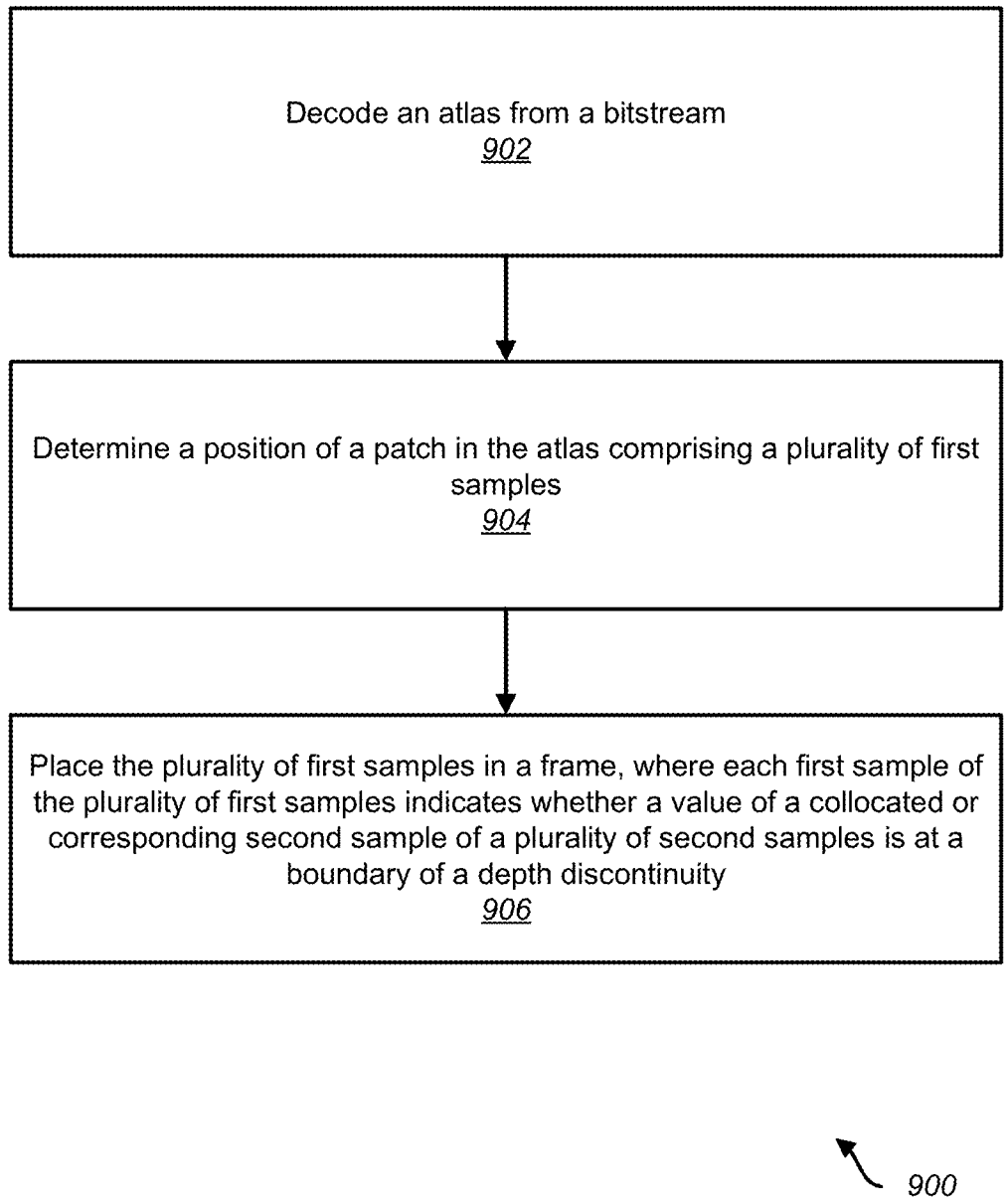
FIG. 9 shows an example method for decoding a multiview sequence.

FIG. 9 shows an example method for decoding a multi-view sequence in. One or more steps of the example method 900 of FIG. 9 may be performed by a decoder, such as the decoder 600 as shown in FIG. 6.

At step 902, the decoder may decode an atlas from a bitstream. At step 904, the decoder may determine a position of a patch, in the atlas, comprising a plurality of first samples. The patch may comprise an entire frame that comprises the plurality of first samples.

At step 906, the decoder may place (e.g., insert) the plurality of first samples in a frame. The decoder may generate the frame based on inserting the plurality of first samples in the frame. Each first sample, of the plurality of first samples, may indicate whether a value of a collocated or corresponding second sample of a plurality of second samples is at a boundary of a depth discontinuity.

A second sample, of the plurality of second samples, may be collocated with a first sample, of the plurality of first samples, for example, based on the second sample being located at a same position in a same frame as the first sample. A second sample of the plurality of second samples may be collocated with a first sample of the plurality of first samples, for example, based on the second sample being located at a same position (as the first sample) in a frame different from a frame comprising the first sample.

The frame may be an attribute frame. The decoder may receive, via the bitstream, an indication that a type of the attribute frame is an edge feature type attribute frame.

The frame may be a geometry frame comprising both the plurality of first samples and the plurality of second samples. The decoder may receive, via the bitstream, an indication that the atlas comprises the plurality of first samples. The decoder may receive, via a bitstream, an indication that a color channel of the atlas comprises the plurality of first samples. A first sample array of the frame may comprise the plurality of first samples, and a second sample array of the frame may comprise the plurality of second samples. The first sample array may be a chrominance sample array, and the second sample array may be a luminance sample array. The frame, comprising the plurality of first samples, may be part of/associated with a basic source view or an additional source view.

The plurality of second samples may each indicate a depth of a portion of a scene projected to a position of a collocated or corresponding sample (e.g., in an attribute frame). A second sample of the plurality of second samples may be determined to be at a boundary of a depth discontinuity based on an edge detection algorithm The edge detection algorithm may be a Canny edge detection algorithm, or any other edge detection algorithm.

The collocated or corresponding second sample, of the plurality of second samples, may be determined to be at the boundary of the depth discontinuity, for example, based on a gradient magnitude at the second sample. The collocated or corresponding second sample, of the plurality of second samples, may be determined to be at the boundary of the depth discontinuity, for example, based on a gradient magnitude at the second sample being greater than a threshold.

Figure 10:
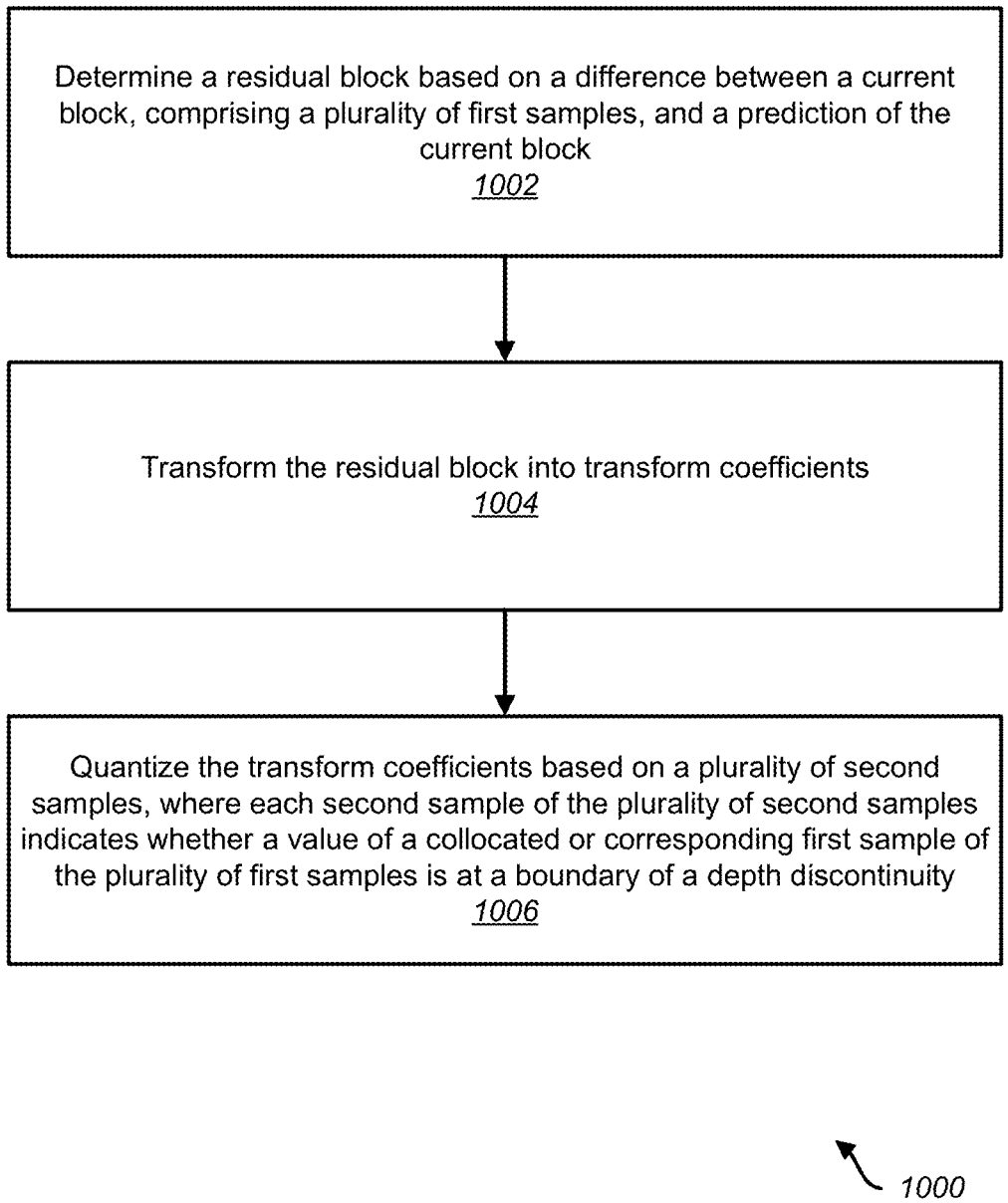
FIG. 10 shows an example method for encoding.

FIG. 10 shows an example method for encoding. One or more steps of the example method 1000 may be performed by an encoder, such as the encoder 700 in FIG. 7.

At step 1002, the encoder may determine a residual block. The encoder may determine the residual block, for example, based on a difference between a current block, comprising a plurality of first samples, and a prediction of the current block.

At step 1004, the encoder may transform the residual block into transform coefficients. The encoder may transform the residual block into transform coefficients, for example, by using at least one of a cosine transform, sine transform, and/or any other type of transform with the residual block.

At step 1006, the encoder may quantize the transform coefficients. The encoder may quantize the transform coefficients, for example, based on a plurality of second samples. Each second sample, of the plurality of second samples, may indicate whether a value of a collocated or corresponding first sample, of the plurality of first samples, is at a boundary of a depth discontinuity.

The encoder may quantize the transform coefficients (e.g., corresponding to the residual block associated with the plurality of first samples) with a quantization step. The quantization step may be determined based on the plurality of second samples. The quantization step size may be decreased, for example, based on one or more of the plurality of second samples indicating that values of one or more of the plurality of first samples are at the boundary of the depth discontinuity. The quantization step size may remain unchanged, for example, based on one or more of the plurality of second samples indicating that values of one or more of the plurality of first samples are not at the boundary of the depth discontinuity. The encoder may entropy encode the transform coefficients.

The encoder may generate a bitstream comprising the quantized transform coefficients. The quantized transform coefficients may be entropy encoded. The quantized transform coefficients may be entropy encoded, for example, before being included in the bitstream. The bitstream may or may not comprise the plurality of second samples.

A first sample, of the plurality of first samples, may be collocated with a second sample of the plurality of second samples, for example, based on the first sample being located at a same position in a same atlas as the second sample. A first sample, of the plurality of first samples, may be collocated with a second sample, of the plurality of second samples, for example, based on the first sample being located at a same position (as the second sample) in an atlas different from an atlas comprising the second sample.

An attribute atlas may comprise the plurality of second samples. A geometry atlas may comprise both the plurality of first samples and the plurality of second samples. A first sample array may comprise the plurality of first samples, and a second sample array may comprise the plurality of second samples. The first sample array may be a chrominance sample array, and the second sample array may be a luminance sample array. The plurality of first samples may each indicate a depth of a portion of a scene projected to a position of a sample in an attribute frame.

A first sample of the plurality of first samples may be determined to be at a boundary of a depth discontinuity. A first sample of the plurality of first samples may be determined to be at a boundary of a depth discontinuity, for example, based on an edge detection algorithm. The edge detection algorithm may be a Canny edge detection algorithm, or any other edge detection algorithm.

The collocated or corresponding first sample, of the plurality of first samples, may be determined to be at the boundary of the depth discontinuity. collocated or corresponding first sample, of the plurality of first samples, may be determined to be at the boundary of the depth discontinuity, for example, based on a gradient magnitude at the first sample. The collocated or corresponding first sample, of the plurality of first samples, may be determined to be at the boundary of the depth discontinuity, for example, based on a gradient magnitude at the first sample being greater than a threshold.

Various examples as described herein may be implemented in hardware (e.g., using analog and/or digital circuits), in software (e.g., through execution of instructions by one or more general purpose or special-purpose processors), and/or as a combination of hardware and software. Various examples as described herein may be implemented in the environment of a computer system and/or other processing system.

Figure 11:
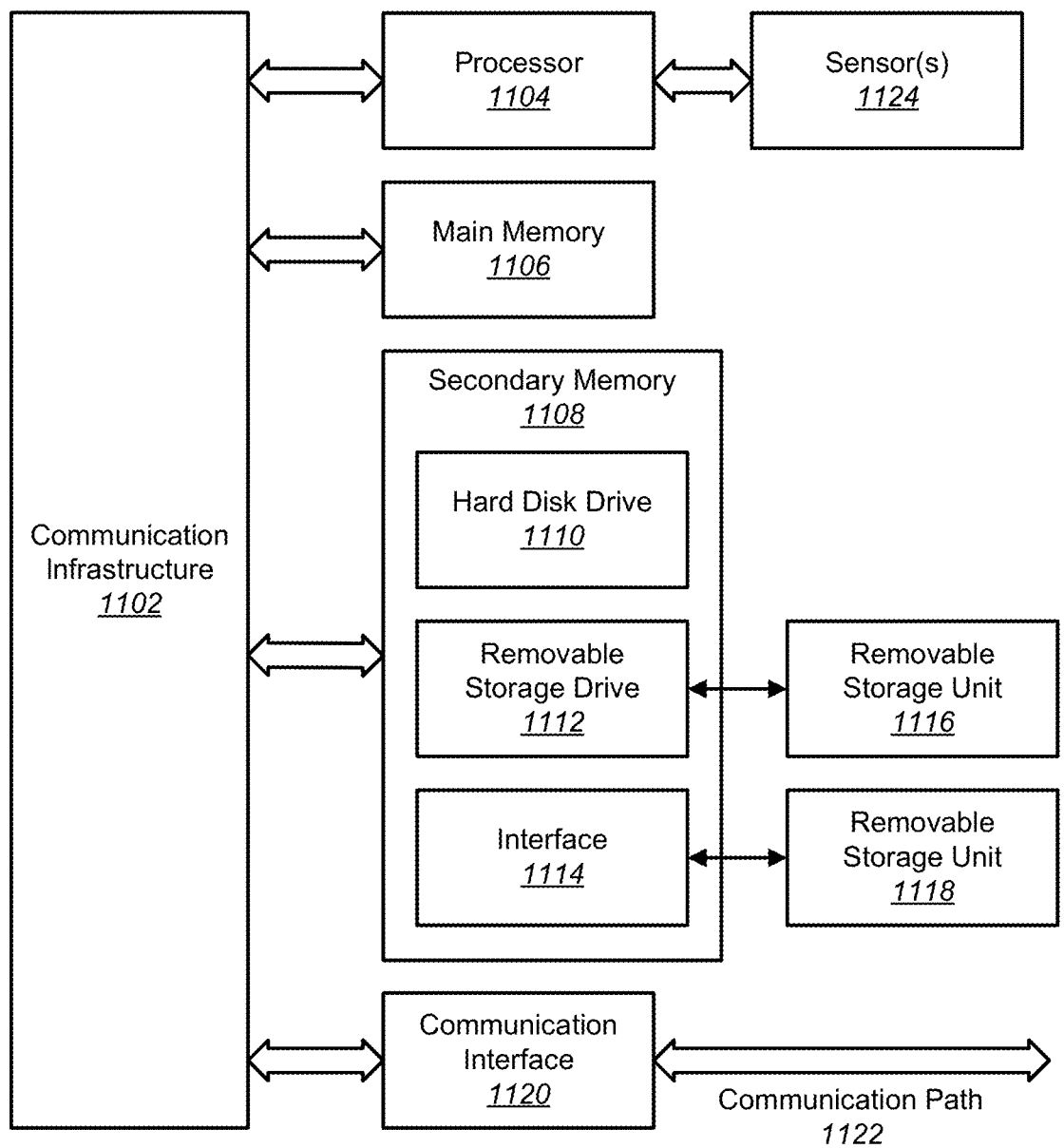
FIG. 11 shows an example computer system.

FIG. 11 shows an example computer system. The example computer system may be used for implementing the various examples as described herein. Blocks/modules depicted in the figures herein (e.g., such as the blocks in FIGS. 1-3 and 5-7, may be implemented/executed on one or more computer systems 1100 shown in FIG. 11. Various steps shown in FIGS. 8-10 may be implemented/executed on one or more computer systems 1100. The computer systems 1100 may be interconnected to one or more networks to form a cluster of computer systems that may act as a single pool of seamless resources, for example, if more than one computing system is used for implementing the various examples described herein. The interconnected computer systems may form a "cloud" of computers.

The computer system 1100 may comprise one or more processors, such as a processor 1104. The processor 1104 may be a special purpose processor, a general purpose processor, a microprocessor, and/or a digital signal processor. The processor 1104 may be connected to a communication infrastructure 1102 (for example, a bus or network). The computer system 1100 may also comprise a main memory 1106 (e.g., a random access memory (RAM)), and/or a secondary memory 1108.

The secondary memory 1108 may comprise a hard disk drive 1110 and/or a removable storage drive 1112 (e.g., a magnetic tape drive, an optical disk drive, and/or the like). The removable storage drive 1112 may read from and/or write to a removable storage unit 1116. The removable storage unit 1116 may comprise a magnetic tape, optical disk, and/or the like. The removable storage unit 1116 may be read by and/or may be written to the removable storage drive 1112. The removable storage unit 1116 may comprise a computer usable storage medium having stored therein computer software and/or data.

The secondary memory 1108 may comprise other similar means for allowing computer programs or other instructions to be loaded into the computer system 1100. Such means may include a removable storage unit 1118 and/or an interface 1114. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 1118 and interfaces 1114 which may allow software and/or data to be transferred from the removable storage unit 1118 to the computer system 1100.

The computer system 1100 may also comprise a communications interface 1120. The communications interface 1120 may allow software and data to be transferred between the computer system 1100 and external devices. Examples of the communications interface 1120 may include a modem, a network interface (e.g., an Ethernet card), a communications port, etc. Software and/or data transferred via the communications interface 1120 may be in the form of signals which may be electronic, electromagnetic, optical, and/or other signals capable of being received by the communications interface 1120. The signals may be provided to the communications interface 1120 via a communications path 1122. The communications path 1122 may carry signals and may be implemented using wire or cable, fiber optics, a phone line, a cellular phone link, an RF link, and/or any other communications channel(s).

The computer system 1100 may comprise one or more sensor(s) 1124. The sensor(s) 1124 may measure and/or detect one or more physical quantities and convert the measured and/or detected physical quantities into electrical signals in digital and/or analog form. For example, the sensor(s) 1124 may include an eye tracking sensor to track eye movement of a user. A display of a point cloud may be updated, for example, based on the eye movement of a user. The sensor(s) 1124 may include a head tracking sensor to the track the head movement of a user. A display of a point cloud may be updated, for example, based on the head movement of a user. The sensor(s) 1124 may include a camera sensor (e.g., for capturing images/photographs) and/or one or more 3D scanning devices (e.g., a laser scanning device, a structured light scanning device, and/or modulated light scanning device). The 3D scanning devices may obtain geometry information by moving one or more laser heads, structured lights, and/or modulated light cameras relative to the object or scene being scanned. The geometry information may be used to construct a point cloud.

A computer program medium and/or a computer readable medium may be used to refer to tangible storage media, such as removable storage units 1116 and 1118 or a hard disk installed in the hard disk drive 1110. The computer program products may be means for providing software to the computer system 1100. The computer programs (which may also be called computer control logic) may be stored in the main memory 1106 and/or the secondary memory 1108. The computer programs may be received via the communications interface 1120. Such computer programs, when executed, may enable the computer system 1100 to implement the present disclosure as discussed herein. In particular, the computer programs, when executed, may enable the processor 1104 to implement the processes of the present disclosure, such as any of the methods described herein. Accordingly, such computer programs may represent controllers of the computer system 1100.

Figure 12:
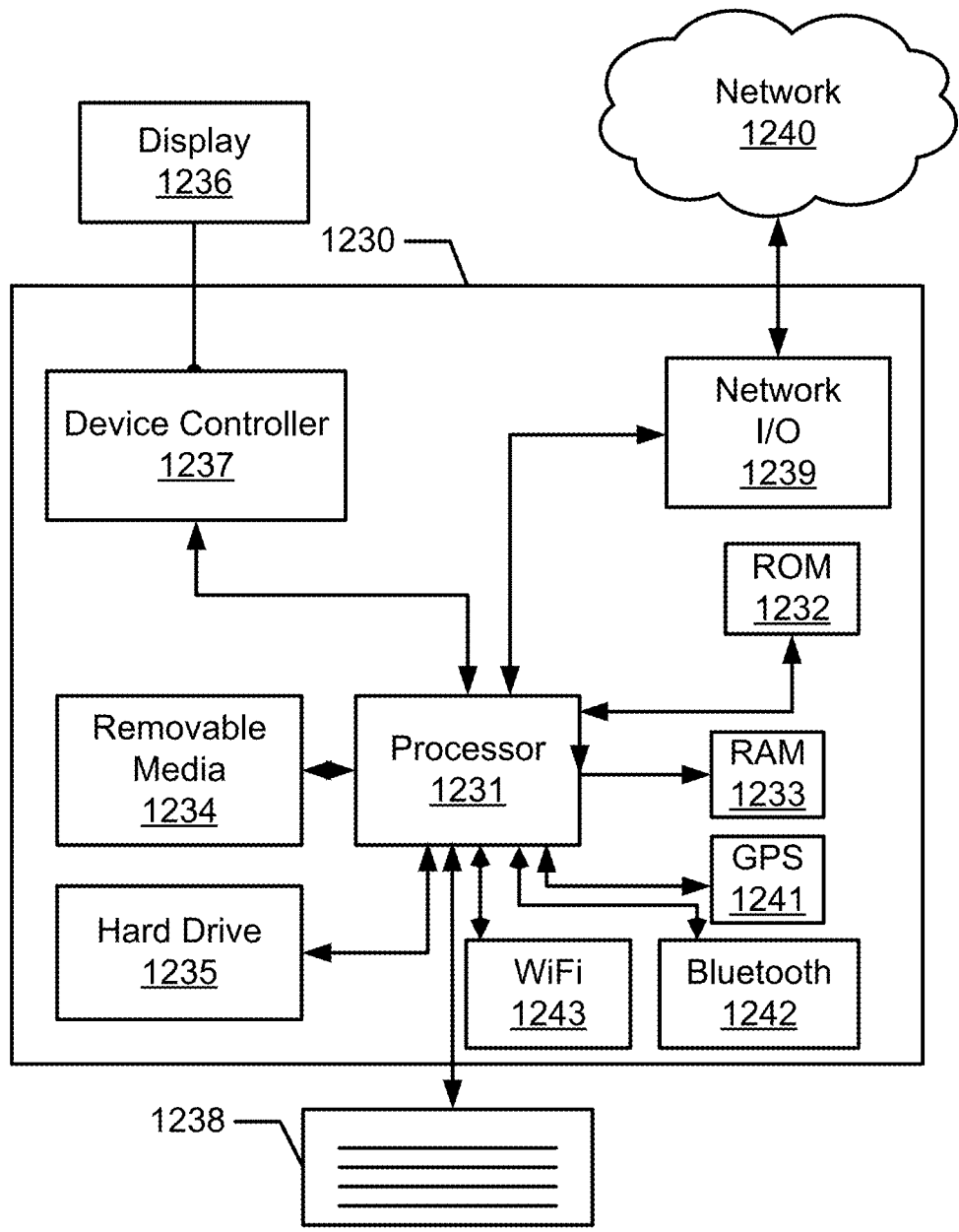
FIG. 12 shows example elements of a computing device that may be used to implement any of the various devices described herein.

FIG. 12 shows example elements of a computing device that may be used to implement any of the various devices described herein, including, for example, a source device (e.g., 102), an encoder (e.g., 200), a destination device (e.g., 106), a decoder (e.g., 300), and/or any computing device described herein. The computing device 1230 may include one or more processors 1231, which may execute instructions stored in the random-access memory (RAM) 1233, the removable media 1234 (such as a Universal Serial Bus (USB) drive, compact disk (CD) or digital versatile disk (DVD), or floppy disk drive), or any other desired storage medium. Instructions may also be stored in an attached (or internal) hard drive 1235. The computing device 1230 may also include a security processor (not shown), which may execute instructions of one or more computer programs to monitor the processes executing on the processor 1231 and any process that requests access to any hardware and/or software components of the computing device 1230 (e.g., ROM 1232, RAM 1233, the removable media 1234, the hard drive 1235, the device controller 1237, a network interface 1239, a GPS 1241, a Bluetooth interface 1242, a WiFi interface 1243, etc.). The computing device 1230 may include one or more output devices, such as the display 1236 (e.g., a screen, a display device, a monitor, a television, etc.), and may include one or more output device controllers 1237, such as a video processor. There may also be one or more user input devices 1238, such as a remote control, keyboard, mouse, touch screen, microphone, etc. The computing device 1230 may also include one or more network interfaces, such as a network interface 1239, which may be a wired interface, a wireless interface, or a combination of the two. The network interface 1239 may provide an interface for the computing device 1230 to communicate with a network 1240 (e.g., a RAN, or any other network). The network interface 1239 may include a modem (e.g., a cable modem), and the external network 1240 may include communication links, an external network, an in-home network, a provider's wireless, coaxial, fiber, or hybrid fiber/coaxial distribution system (e.g., a DOCSIS network), or any other desired network. Additionally, the computing device 1230 may include a location-detecting device, such as a global positioning system (GPS) microprocessor 1241, which may be configured to receive and process global positioning signals and determine, with possible assistance from an external server and antenna, a geographic position of the computing device 1230.

The example in FIG. 12 may be a hardware configuration, although the components shown may be implemented as software as well. Modifications may be made to add, remove, combine, divide, etc. components of the computing device 1230 as desired. Additionally, the components may be implemented using basic computing devices and components, and the same components (e.g., processor 1231, ROM storage 1232, display 1236, etc.) may be used to implement any of the other computing devices and components described herein. For example, the various components described herein may be implemented using computing devices having components such as a processor executing computer-executable instructions stored on a computer-readable medium, as shown in FIG. 12. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may receive a plurality of first samples, wherein each first sample of the plurality of first samples indicates whether a collocated second sample of a plurality of second samples is at a boundary of a depth discontinuity. The computing device may generate, based on a patch that comprises one or more of the plurality of first samples, an atlas. The computing device may also perform one or more additional operations. A second sample, of the plurality of second samples, may be collocated with a first sample, of the plurality of first samples, based on the second sample being located at a same position in a same frame as the first sample. A second sample, of the plurality of second samples, may be collocated with a first sample, of the plurality of first samples, based on the second sample being located at a same position in a frame different from a frame comprising the first sample. An attribute frame may comprise the plurality of first samples. The computing device may send an indication that a type of the attribute frame is an edge feature type attribute frame. A geometry frame may comprise the plurality of first samples and the plurality of second samples. The computing device may, based on a gradient magnitude at the collocated second sample, determining that the collocated second sample, of the plurality of second samples, is at the boundary of the depth discontinuity. The computing device may determine a residual block based on a difference between a current block, comprising at least a subset of the plurality of second samples, and a prediction of the current block. The computing device may generate, based on the residual block, transform coefficients. The computing device may quantize the transform coefficients. The frame may correspond to a basic source view or an additional source view. The each of the plurality of second samples may indicate a respective depth of a portion of a scene projected to a position of a collocated sample in an attribute frame. The computing device may, based on an edge detection algorithm, determine that the collocated second sample, of the plurality of second samples, is at the boundary of the depth discontinuity. The edge detection algorithm may be a Canny edge detection algorithm. The computing device may send an indication that the atlas comprises the plurality of first samples. The computing device may send an indication that a chroma channel of the atlas comprises the plurality of first samples. A first sample array may comprise the plurality of first samples. A second sample array may comprise the plurality of second samples. The first sample array may be a chrominance sample array. The second sample array may be a luminance sample array. The patch may comprise an entire frame comprising the plurality of first samples. The computing device may, based on a gradient magnitude at the collocated second sample exceeding a threshold, determine that the collocated second sample, of the plurality of second samples, is at the boundary of the depth discontinuity. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to receive the atlas. A computer-readable medium may store instructions that, when executed, cause performance of the described method, additional operations and/or include the additional elements.

A computing device may perform a method comprising multiple operations. The computing device may receive an atlas comprising a plurality of first samples. The computing device may generate a frame based on inserting the plurality of first samples in the frame. Each first sample, of the plurality of first samples, may indicate whether a collocated second sample, of a plurality of second samples, is at a boundary of a depth discontinuity. The computing device may also perform one or more additional operations. A second sample, of the plurality of second samples, may be collocated with a first sample, of the plurality of first samples, based on the second sample being located at a same position in the frame as the first sample. A second sample, of the plurality of second samples, may be collocated with a first sample, of the plurality of first samples, based on the second sample being located at a same position in a frame different from the frame comprising the first sample. The frame may be an attribute frame. The computing device may receive an indication that a type of the attribute frame is an edge feature type attribute frame. The frame may be a geometry frame comprising both the plurality of first samples and the plurality of second samples. The collocated second sample, of the plurality of second samples, may be determined to be at the boundary of the depth discontinuity based on a gradient magnitude at the collocated second sample. The computing device may receive quantized transform coefficients associated with a residual block. The residual block may be based on a difference between a current block, comprising at least a subset of the plurality of second samples, and a prediction of the current block. The frame may correspond to a basic source view or an additional source view. The computing device may determine a position of a patch, in the atlas, comprising the plurality of first samples. The generating the frame may comprise inserting the patch at the determined position in the frame. The patch may comprise an entirety of the frame. The each of the plurality of second samples may indicate a respective depth of a portion of a scene projected to a position of a collocated sample in an attribute frame. The collocated second sample, of the plurality of second samples, may be determined to be at the boundary of the depth discontinuity based on an edge detection algorithm. The edge detection algorithm may be a Canny edge detection algorithm. The collocated second sample, of the plurality of second samples, may be determined to be at the boundary of the depth discontinuity based on a gradient magnitude at the collocated second sample exceeding a threshold. The computing device may receive an indication that a chroma channel of the atlas comprises the plurality of first samples. The computing device may receive an indication that the atlas comprises the plurality of first samples. A first sample array may comprise the plurality of first samples. A second sample array may comprise the plurality of second samples. The first sample array may be a chrominance sample array. The second sample array may be a luminance sample array. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to send the atlas. A computer-readable medium may store instructions that, when executed, cause performance of the described method, additional operations and/or include the additional elements.

A computing device may perform a method comprising multiple operations. The computing device may determine a plurality of first samples. Each first sample of the plurality of first samples may indicate whether a value of a collocated second sample of a plurality of second samples is at a boundary of a depth discontinuity. The computing device may determine a residual block based on a difference between a current block, comprising a plurality of second samples, and a prediction of the current block. The computing device may generate, based on the residual block, transform coefficients. The computing device may quantize the transform coefficients based on the plurality of first samples. The computing device may also perform one or more additional operations. The quantizing the transform coefficients may comprise quantizing the transform coefficients with a quantization step determined based on the plurality of first samples. The quantizing the transform coefficients may comprise, based on one or more of the plurality of first samples indicating that values of one or more of the plurality of second samples are at the boundary of the depth discontinuity, quantizing the transform coefficients with a smaller quantization step size. The computing device may generate a bitstream comprising the quantized transform coefficients. The bitstream may or may not comprise the plurality of first samples. The computing device may entropy encode the transform coefficients before including the quantized transform coefficients in the bitstream. The generating the transform coefficients may comprise using at least one of a cosine transform or sine transform to transform the residual block. A first sample of the plurality of first samples may be collocated with a second sample of the plurality of second samples based on the first sample being located at a same position in an atlas as the second sample. A geometry atlas may comprise both the plurality of first samples and the plurality of second samples. A first sample of the plurality of first samples may be collocated with a second sample of the plurality of second samples based on the first sample being located at a same position in an atlas different from an atlas comprising the second sample. An attribute atlas may comprise the plurality of first samples. The computing device may entropy encode the transform coefficients. A first sample array may comprise the plurality of first samples. A second sample array may comprise the plurality of second samples. The first sample array may be a chrominance sample array. The second sample array may be a luminance sample array. The plurality of second samples may each indicate a depth of a portion of a scene projected to a position of a sample in an attribute frame. A second sample of the plurality of second samples may be determined to be at a boundary of a depth discontinuity based on an edge detection algorithm. The edge detection algorithm may be a Canny edge detection algorithm. The collocated second sample of the plurality of first samples may be determined to be at the boundary of the depth discontinuity based on a gradient magnitude at the second sample. The collocated second sample of the plurality of first samples may be determined to be at the boundary of the depth discontinuity based on a gradient magnitude at the second sample being greater than a threshold. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to to receive the transform coefficients. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   receiving, by a computing device, a plurality of first samples, wherein each first sample of the plurality of first samples indicates whether a collocated second sample of a plurality of second samples is at a boundary of a depth discontinuity; and
   generating, based on a patch that comprises one or more of the plurality of first samples, an atlas.

2. The method of claim 1, wherein a second sample, of the plurality of second samples, is collocated with a first sample, of the plurality of first samples, based on the second sample being located at a same position in a same frame as the first sample.

3. The method of claim 1, wherein a second sample, of the plurality of second samples, is collocated with a first sample, of the plurality of first samples, based on the second sample being located at a same position in a frame different from a frame comprising the first sample.

4. The method of claim 1, wherein an attribute frame comprises the plurality of first samples.

5. The method of claim 1, wherein a geometry frame comprises the plurality of first samples and the plurality of second samples.

6. The method of claim 1, further comprising, based on a gradient magnitude at the collocated second sample, determining that the collocated second sample, of the plurality of second samples, is at the boundary of the depth discontinuity.

7. The method of claim 1, further comprising:
   determining a residual block based on a difference between a current block, comprising at least a subset of the plurality of second samples, and a prediction of the current block;
   generating, based on the residual block, transform coefficients; and
   quantizing the transform coefficients.

8. A method comprising:
   receiving, by a computing device, an atlas comprising a plurality of first samples; and
   generating a frame based on inserting the plurality of first samples in the frame, wherein each first sample, of the plurality of first samples, indicates whether a collocated second sample, of a plurality of second samples, is at a boundary of a depth discontinuity.

9. The method of claim 8, wherein a second sample, of the plurality of second samples, is collocated with a first sample, of the plurality of first samples, based on the second sample being located at a same position in the frame as the first sample.

10. The method of claim 8, wherein a second sample, of the plurality of second samples, is collocated with a first sample, of the plurality of first samples, based on the second sample being located at a same position in a frame different from the frame comprising the first sample.

11. The method of claim 8, wherein the frame is an attribute frame.

12. The method of claim 8, wherein the frame is a geometry frame comprising both the plurality of first samples and the plurality of second samples.

13. The method of claim 8, wherein the collocated second sample, of the plurality of second samples, is determined to be at the boundary of the depth discontinuity based on a gradient magnitude at the collocated second sample.

14. The method of claim 8, further comprising:
   receiving quantized transform coefficients associated with a residual block, wherein the residual block is based on a difference between a current block, comprising at least a subset of the plurality of second samples, and a prediction of the current block.

15. A method comprising:
   determining a plurality of first samples, wherein each first sample of the plurality of first samples indicates whether a collocated second sample of a plurality of second samples is at a boundary of a depth discontinuity;

determining a residual block based on a difference between a current block, comprising the plurality of second samples, and a prediction of the current block;

generating, based on the residual block, transform coefficients;

quantizing the transform coefficients based on the plurality of first samples; and generating, based on a patch that comprises one or more of the plurality of first samples, an atlas.

16. The method of claim 15, wherein the quantizing the transform coefficients further comprises quantizing the transform coefficients with a quantization step determined based on the plurality of first samples.

17. The method of claim 15, wherein the quantizing the transform coefficients further comprises:

based on one or more of the plurality of first samples indicating that one or more of the plurality of second samples are at the boundary of the depth discontinuity, quantizing the transform coefficients with a smaller quantization step size.

18. The method of claim 15, further comprising generating a bitstream comprising the quantized transform coefficients, wherein the bitstream does not comprise the plurality of first samples.

19. The method of claim 15, wherein the generating the transform coefficients comprises using at least one of a cosine transform or sine transform to transform the residual block.

20. The method of claim 15, wherein a first sample of the plurality of first samples is collocated with a second sample of the plurality of second samples based on the first sample being located at a same position in the atlas as the second sample.

* * * * *